(12) United States Patent
Mathai et al.

(10) Patent No.: US 12,328,182 B2
(45) Date of Patent: Jun. 10, 2025

(54) OPTICAL DEVICES FOR COARSE WAVELENGTH DIVISION MULTIPLEXING WAVEBANDS

(71) Applicant: HEWLETT PACKARD ENTERPRISE DEVELOPMENT LP, Houston, TX (US)

(72) Inventors: Sagi Varghese Mathai, Sunnyvale, CA (US); Michael Renne Ty Tan, Menlo Park, CA (US); Wayne Victor Sorin, Mountain View, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 427 days.

(21) Appl. No.: 17/687,406

(22) Filed: Mar. 4, 2022

(65) Prior Publication Data

US 2023/0283396 A1 Sep. 7, 2023

(51) Int. Cl.
*H04B 10/00* (2013.01)
*H04J 14/02* (2006.01)
*H04J 14/00* (2006.01)

(52) U.S. Cl.
CPC ...... *H04J 14/0227* (2013.01); *H04J 14/0278* (2013.01)

(58) Field of Classification Search
CPC ........ H01S 5/0268; H01S 5/40; H01S 5/4025; H01S 5/4062; H01S 5/4068; H01S 5/4087
See application file for complete search history.

(56) References Cited

U.S. PATENT DOCUMENTS

2005/0025488 A1* 2/2005 Wang ............... H04J 14/0216 398/83
2019/0341740 A1* 11/2019 Zilkie ..................... H01S 5/125

* cited by examiner

*Primary Examiner* — Daniel G Dobson
(74) *Attorney, Agent, or Firm* — Sheppard Mullin Richter & Hampton LLP

(57) ABSTRACT

Systems and methods are provided for achieving graceful bandwidth scaling (i.e. higher data transmission rates) for Coarse Wavelength Division Multiplexing (CWDM) and CWDM-4 technologies. Examples utilize a waveband architecture built around the CWDM wavelengths. This waveband architecture adds additional wavelength transmission channels (which may equate to faster data transmission rates) while maintaining backwards compatibility with existing CWDM/CWDM-4 technologies. Examples may include waveband devices (e.g. waveband light sources, waveband transmitters, waveband receivers, waveband transceivers, etc.) designed to operate with one or more CWDM wavebands while maintaining backwards compatibility with existing CWDM-4 technologies.

20 Claims, 15 Drawing Sheets

OPTICAL DEVICES FOR COARSE WAVELENGTH DIVISION MULTIPLEXING WAVEBANDS

BACKGROUND

Wavelength-division multiplexing (WDM) may refer to technologies which combine multiple optical signals of different wavelengths onto a common optical fiber. These optical signals may be transmitted simultaneously over the optical fiber via separate wavelength transmission channels (for concept illustration, these wavelength transmission channels may be viewed as separate lanes of a highway for different colors of light, e.g. a lane/transmission channel for green light, a lane/transmission channel for blue light, etc.). There are two traditional approaches to WDM: Coarse Wavelength Division Multiplexing (CWDM), and Dense Wavelength Division Multiplexing (DWDM).

CWDM uses wider wavelength transmission channel spacing than DWDM. For example, certain CWDM technologies may space wavelength transmission channels approximately 20 nanometers (nm) apart on the electromagnetic spectrum. These wavelengths may be referred to as CWDM wavelengths.

CWDM-4 is an industry standard which targets a common specification for optical interconnects (such as pluggable optical transceiver modules) that are used in various applications, such as datacenters. The CWDM-4 standard utilizes four CWDM wavelengths: approximately 1271, 1291, 1311, and 1331 nm. These four wavelengths may be referred to as the CWDM-4 wavelengths.

DWDM generally uses a higher number of wavelength transmission channels per optical fiber than CWDM. DWDM may accommodate these additional channels by packing the channels more densely than CWDM. For example, DWDM wavelengths may be spaced approximately 0.4 nm or 0.8 nm apart (i.e. 25-50 times more closely than with CWDM).

BRIEF DESCRIPTION OF THE DRAWINGS

The present disclosure, in accordance with one or more various examples, is described in detail with reference to the following figures. The figures are provided for purposes of illustration only and merely depict typical or example examples.

Figure 1:
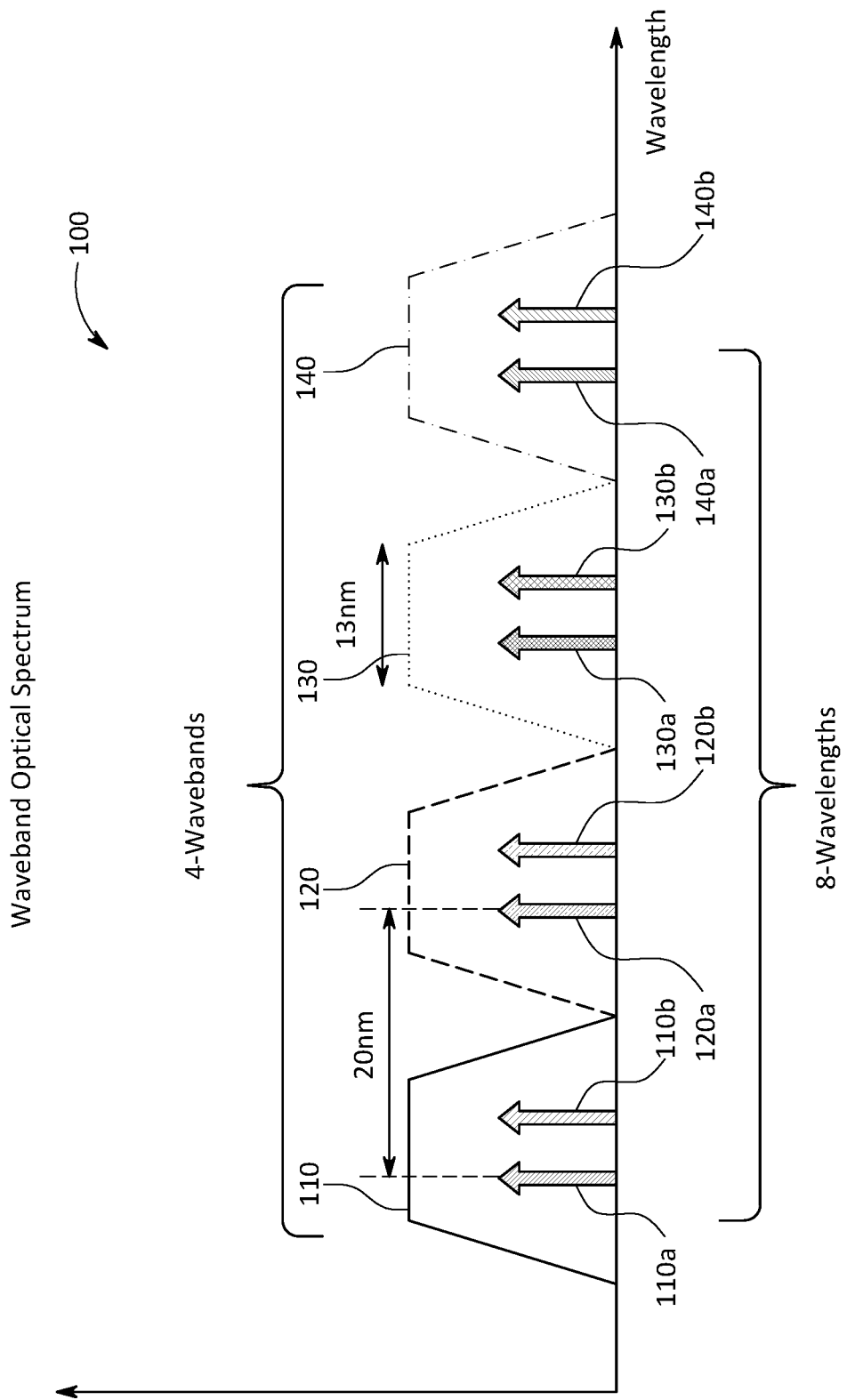
FIG. 1 is an example diagram which illustrates a Coarse Wavelength Division Multiplexing waveband architecture, in accordance with various examples of the presently disclosed technology.

The figures are not exhaustive and do not limit the present disclosure to the precise form disclosed.

DETAILED DESCRIPTION

Optical interconnects (e.g. devices which transmit signals from one location to another using light) are often used in high performance computer networks as they are able to achieve high bandwidth over long distances with less power compared to electrical interconnects.

Pluggable optical transceiver modules are components in optical interconnects which may contain a coherent light source (e.g. a laser), an optical data transmitter (an optical device which can impart data onto an optical signal by modulating the optical signal) and an optical receiver (an optical device which can detect modulated optical signals) in the same physical package. Many of these pluggable optical transceiver modules are designed to operate with the CWDM-4 standard. In particular, they are designed to produce, modulate, and detect a single wavelength (within a certain tolerance value) per CDWM-4 passband (as used herein, a CWDM or CWDM-4 passband may refer to a spectrum of wavelengths that includes a CWDM/CWDM-4 wavelength, which can pass through an optical filter). In certain technology spaces such as datacenters, CWDM-4 pluggable optical transceiver modules are used ubiquitously. Utilizing an industry standard 100 Gigabit (G) serializer/deserializer (SERDES), these CDWM-4 modules may achieve data transmission rates of approximately 400 Gigabits per second (Gbps) (i.e. 100 G×4 wavelength transmission channels) per optical fiber.

However, it is expected that future networks will require higher data transmission rates (e.g. 800 Gbps). Unfortunately, the CWDM-4 pluggable optical transceiver modules (and other CWDM-4 equipment) cannot achieve these higher rates at the SERDES standard of 100 G.

One approach for increasing transmission rate at the current 100 G SERDES standard would be to increase the number of wavelength transmission channels per optical fiber (this is because data transmission rate per optical fiber is approximately proportional to the number of transmission channels per optical fiber). Accordingly, certain industries (e.g. telecommunications) have migrated to Dense Wavelength Division Multiplexing (DWDM). As described above, DWDM may accommodate a large number of wavelength transmission channels per optical fiber by packing transmission channels more densely than CWDM.

However, migration to DWDM comes at a cost. Because the wavelength transmission channels for DWDM are packed more densely, DWDM equipment (e.g. light sources/lasers) must be more precise, and accordingly, more expensive. Additionally, in certain applications such as datacenters, the channel spacing of DWDM may be too close. This is because when data is imparted onto an optical signal, the optical signal's spectrum becomes wider. In applications like datacenters where large data packets (i.e. "large data payloads") are imparted into optical signals, the widened optical signals may overlap/interfere when traveling along densely packed transmission channels, resulting in cross talk and higher bit error rates.

Against this backdrop, examples of the presently disclosed technology achieve graceful bandwidth scaling (i.e. higher data transmission rate) by utilizing a waveband architecture built around the CWDM wavelengths. This waveband architecture adds additional wavelength transmission channels (as described above, additional transmission channels may equate to higher data transmission rates) while maintaining backwards compatibility with existing CWDM/CWDM-4 technologies (e.g. CWDM-4 pluggable optical transceiver modules).

In accordance with various examples, a CWDM waveband architecture may comprise one or more CWDM wavebands. A CWDM waveband may refer to two or more wavelengths within a CWDM passband. As described above, a CWDM passband may refer to a spectrum of wavelengths that includes one CWDM wavelength that can pass through an optical filter.

Accordingly, examples of the presently disclosed technology may include waveband devices (e.g. waveband light sources, waveband transmitters, waveband receivers, waveband transceivers, etc.) designed to operate with one or more CWDM wavebands while maintaining backwards compatibility with existing CWDM-4 technologies. These waveband devices may be constructed using readily available building blocks used for existing CWDM-4 technologies.

For example, utilizing the CWDM waveband concepts of the present disclosure and building blocks found in silicon photonic and III-V foundry process design kits (e.g. CWDM-4 distributed feedback lasers, wideband fiber to chip couplers, CWDM-4 optical filters, etc.) a "waveband light source" may be constructed to operate in two modes. In the first mode, the waveband light source may produce a single wavelength per CWDM-4 passband (consistent/compliant with existing CWDM-4 technologies). In the second mode, the waveband light source may produce multiple wavelengths per CWDM-4 passband (i.e. CWDM wavebands). To illustrate the concept, a waveband light source may be constructed using eight CWDM-4 distributed feedback lasers. Two of the lasers may be calibrated to produce light within a first CWDM-4 passband (the first CWDM-4 passband may comprise a spectrum of wavelengths between, e.g., 1264.5 nm-1277.5 nm). These two lasers may be calibrated to produce different wavelengths of light within the first CWDM-4 passband (e.g. 1268.5 nm and 1273.5 nm respectively). In the same/similar manner: two lasers may be calibrated to produce wavelengths of light in a second CWDM-4 passband (e.g. 1284.5 nm-1297.5 nm); two lasers may be calibrated to produce wavelengths of light in a third CWDM-4 passband (e.g. 1304.5 nm-1317.5 nm); and two lasers may be calibrated to produce wavelengths of light in a fourth CWDM-4 passband (e.g. 1324.5 nm-1337.5 nm). When this waveband light source operates in the first mode, one laser per waveband/passband may be switched off. Accordingly, the waveband light source may operate seamlessly with existing CWDM-4 technologies which are designed to operate with a single wavelength (within a certain tolerance value) per CWDM-4 passband. When this waveband light source operates in the second mode, all eight lasers may be switched on. Accordingly, the waveband light source may produce eight wavelengths of light within the four CWDM-4 passbands, doubling the number of wavelength transmission channels used by existing CWDM-4 technologies. When used in combination with a waveband transmitter and waveband receiver designed to operate with these eight wavelengths, the waveband light source may facilitate a data transmission rate of approximately 800 Gbps when utilizing 100 G SERDES (i.e. 100 G×8 wavelength transmission channels).

In certain examples, a waveband transmitter may be built using building blocks found in silicon photonic and III-V foundry process design kits (e.g. high speed Mach Zehnder or microring modulators, wideband fiber to chip couplers, etc.). This waveband transmitter may be capable of modulating (1) a single wavelength per CWDM-4 passband (which would be compatible with existing CWDM-4 technologies), and (2) two or more wavelengths per CWDM-4 passband. To illustrate the concept, a waveband transmitter may be constructed using eight optical modulators. Two of the optical modulators may be calibrated to modulate light within a first CWDM-4 passband (e.g. 1264.5 nm-1277.5 nm). These two optical modulators may be calibrated to modulate different wavelengths of light within the first CWDM-4 passband (e.g. 1268.5 nm and 1273.5 nm, respectively). In the same/similar manner: two optical modulators may be calibrated to modulate wavelengths of light in a second CWDM-4 passband (e.g. 1284.5 nm-1297.5 nm); two optical modulators may be calibrated to modulate wavelengths of light in a third CWDM-4 passband (e.g. 1304.5 nm-1317.5 nm); and two optical modulators may be calibrated to modulate wavelengths of light in a fourth CWDM-4 passband (e.g. 1324.5 nm-1337.5 nm). Accordingly, this waveband transmitter may operate seamlessly with existing CWDM-4 light sources and optical receivers (here, four of the eight optical modulators would be used). The waveband transmitter may also be used in combination with waveband light sources and waveband receivers which operate using the CWDM-4 wavebands (here, all eight of the optical modulators may be used). As described above, the combination of waveband devices may achieve a data transmission rate of approximately 800 Gbps when utilizing 100 G SE RDES (i.e. 100 G×8 wavelength transmission channels).

In some examples, a waveband receiver may be built using building blocks found in silicon photonic and III-V foundry process design kits (e.g. monitor or high speed waveguide photodetectors, wideband fiber to chip couplers, etc.). This waveband receiver may be capable of detecting (1) a single modulated wavelength per CWDM-4 passband (which would be compatible with existing CWDM-4 technologies), and (2) two or more modulated wavelengths per CWDM-4 passband. To illustrate the concept, a waveband receiver may be constructed using eight waveguide photodetectors. Two of the waveguide photodetectors may be calibrated to detect modulated light within a first CWDM-4 passband (e.g. 1264.5 nm-1277.5 nm). These two waveguide photodetectors may be calibrated to detect different modulated wavelengths of light within the first CWDM-4 passband (e.g. 1268.5 nm and 1273.5 nm, respectively). In the same/similar manner: two waveguide photodetectors may be calibrated to detect modulated wavelengths of light in a second CWDM-4 passband (e.g. 1284.5 nm-1297.5 nm); two waveguide photodetectors may be calibrated to detect modulated wavelengths of light in a third CWDM-4 passband (e.g. 1304.5 nm-1317.5 nm); and two waveguide photodetectors may be calibrated to detect modulated wavelengths of light in a fourth CWDM-4 passband (e.g. 1324.5 nm-1337.5 nm). Accordingly, this waveband receiver may operate seamlessly with existing CWDM-4 light sources and optical data transmitters (here four of the eight waveguide photodetectors would be used). The waveband receiver may also be used in combination with waveband light sources and waveband transmitters which operate using the CWDM-4 wavebands (here all eight of the waveguide photodetectors may be used). As described above, the combination of waveband devices may achieve a data transmission rate of approximately 800 Gbps when utilizing the industry standard 100 G SERDES (i.e. 100 G×8 wavelength transmission channels).

In various examples, a waveband light source, a waveband transmitter, and a waveband receiver may be incorporated into a single physical structure, such as a pluggable waveband transceiver module and an electrical integrated circuit package. As described above, the pluggable waveband transceiver module and electrical integrated circuit package may be constructed using building blocks used to construct existing CWDM-4 pluggable optical transceiver modules.

Examples of the presently disclosed technology provide numerous advantages over existing CWDM and DWDM technologies. For example, waveband lights sources, transmitters, and receivers may be constructed using readily available building blocks used to construct existing CWDM-4 technologies. In many instances, these building blocks are less expensive than building blocks used to construct DWDM technologies. Another advantage of the presently disclosed technology is that it offers graceful bandwidth scaling options for technology sectors/industries which require wider wavelength transmission channel spacing than DWDM allows for. For example, utilizing DWDM may not be feasible for large data payload applications such as datacenters (as DWDM's sub-one nanometer channel spacing may be too tight for larger data payloads/wider optical signals). However, waveband optical devices may be constructed which operate with, e.g., two wavelength transmission channels per CWDM-4 passband. These wavelength transmission channels may be spaced approximately 4-5 nm apart (as opposed to the 0.4 or 0.8 nm channel spacing of DWDM). Accordingly, data transmission rates may be doubled while maintaining wide enough wavelength transmission channel spacing for larger data payload applications. A third advantage of the presently disclosed technology is that it is backwards compatible with existing CWDM/CWDM-4 technologies. While backwards compatibility is generally advantageous for new technologies, this is especially true in this technology field because CWDM-4 equipment is used so ubiquitously. Accordingly, waveband optical devices which facilitate data transmission rates of 800 Gbps (or higher) while maintaining interoperability with legacy CWDM-4 equipment may be extremely desirable for technology sectors/industries which have grown to rely heavily on CWDM-4 equipment.

FIG. 1 is an example diagram which illustrates a CWDM waveband architecture, in accordance with various examples of the presently disclosed technology. As depicted, CWDM waveband architecture 100 is comprised of four wavebands. However, in other examples a CWDM waveband architecture may be comprised of one or more wavebands.

As described above, a CWDM waveband may refer to two or more wavelengths within a CWDM passband. A CWDM passband may refer to a spectrum of wavelengths that includes a CWDM wavelength—which can pass through an optical filter. CWDM wavelengths may refer to a set of wavelengths spaced approximately 20 nm apart on the electromagnetic spectrum. In certain cases, a CWDM passband may be a spectrum of wavelengths which includes a CWDM-4 wavelength. A CWDM-4 wavelength may be one of 4 wavelengths spaced approximately 20 nm apart, between approximately 1271 nm and 1331 nm on the electromagnetic spectrum (e.g. 1271 nm, 1291 nm, 1311 nm, 1331 nm).

As depicted, CWDM waveband 110 is comprised of two wavelengths spaced approximately 4.3 nm apart: wavelengths 110a and 110b. In other examples, CWDM waveband 110 may be comprised of any number of wavelengths spaced apart by various lengths. However, in certain applications which involve large data payloads, it may be preferable to limit a waveband to 16 or fewer wavelengths. This is because when data is imparted onto an optical signal, the optical signal becomes "wider." Accordingly, as wavelength transmission channels become more densely packed, wider optical signals may begin to overlap/interfere, causing cross talk and bit errors in data transmission.

The CWDM passband for CWDM waveband 110 is centered at the first CWDM-4 wavelength of approximately 1271 nm, and is approximately 13 nm wide. In other examples, a CWDM passband may have a different width (depending on the optical filter being used), and need not be centered at a CWDM-4 wavelength.

CWDM wavebands 120, 130, and 140 are also comprised of two wavelengths. Similar to the CWDM passband for CWDM waveband 110, the CWDM passbands for CWDM wavebands 120, 130, and 140 are each centered at one of the CWDM-4 wavelengths.

As described above, waveband architectures such as waveband architecture 110 increase the number of wavelength transmission channels for CWDM-based technologies. In particular, optical devices designed to operate with waveband architecture 100 may utilize eight wavelength transmission channels (two wavelength transmission channels per CWDM waveband/passband). This is double the number of wavelength transmission channels utilized by existing CWDM-4 technologies. As described above, by doubling the number of wavelength transmission channels, examples of the present technology may double data transmission rates. For concept illustration, if each of the depicted CWDM wavebands included three wavelengths instead of two, data transmission rates could triple that of existing CDWM-4 technologies. However, optical devices designed to operate with three wavelengths per CWDM waveband (as opposed to two), may require additional components/hardware (e.g., additional lasers, additional optical modulators, additional photodetectors, etc.), which may add to the cost of fabrication, operation, etc. Additionally, the narrower channel spacing required to provide three wavelengths per CWDM waveband may not be preferred/optimal for certain applications.

Figure 2:
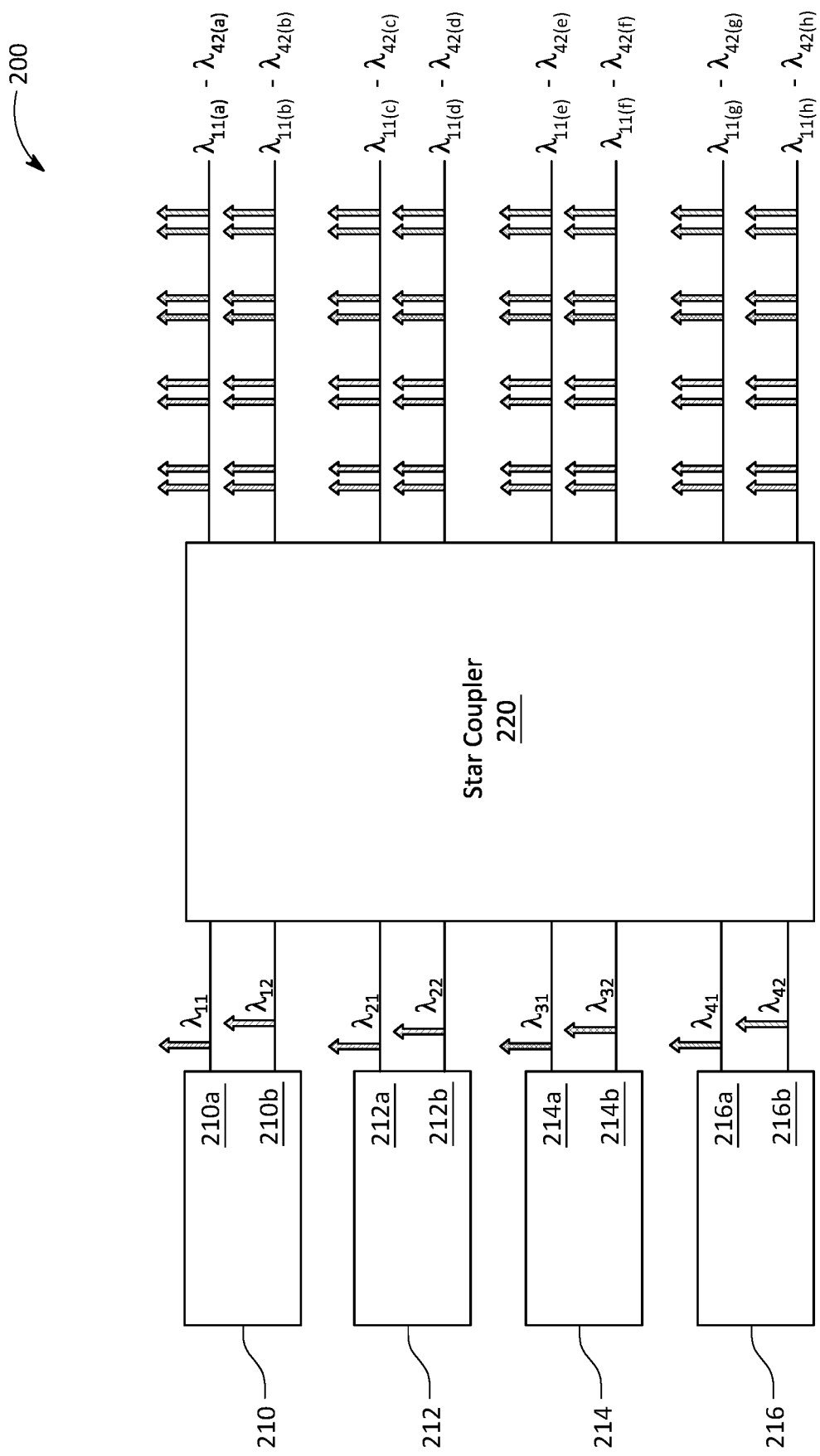
FIG. 2 depicts an example waveband light source, in accordance with various examples of the presently disclosed technology.

FIG. 2 depicts an example waveband light source, in accordance with various examples of the presently disclosed technology. Waveband light source 200 includes four laser arrays, a star coupler, eight input waveguides which connect the laser arrays to the star coupler, and eight output waveguides from the star coupler.

Laser arrays 210, 212, 214, and 216 may be any laser arrays which can produce two or more wavelengths of light within a CWDM passband. As used herein, a laser array may refer to an arrangement of two or more lasers on a single physical structure, such as a silicon chip. As depicted, each of the laser arrays comprises two lasers, but in other examples, laser arrays may comprise additional lasers. In various examples, these laser arrays may be constructed using readily available CWDM-4 distributed feedback lasers found in silicon photonic and III-V foundry process design kits.

Each laser of a laser array may produce coherent light of a particular wavelength within a CWDM passband. For example, laser 210a may produce a first wavelength of light within a first CWDM passband, and laser 210b may produce a second wavelength of light within the first CWDM passband (in practice, these wavelengths may shift slightly based on operation temperature, but the wavelengths will generally shift in the same direction and by the same amount, ensuring that wavelength transmission channel spacing is maintained). Accordingly, the two wavelengths produced by laser array 210 may be referred to as the first CWDM waveband. In the same/similar manner as lasers 210a and 210b, lasers 212a/212b, 214a/214b, and 216a/216b may produce different wavelengths of coherent light within a second, third, and fourth CWDM passband respectively. Accordingly, the wavelengths produced by laser arrays 212, 214, and 216 may be referred to as the second, third, and fourth CWDM wavebands respectively. In various embodiments, these four CWDM passbands/wavebands may be CWDM-4 passbands/wavebands.

In summary, each laser array of waveband light source 200 may produce its own CWDM waveband. These four CWDM wavebands may comprise eight different wavelengths (i.e., eight wavelength transmission channels). Accordingly, waveband light source 200 may simultaneously produce eight optical signals which can be carried on these eight different wavelength transmission channels. These optical signals are represented as $\lambda_{11}$, $\lambda_{12}$, $\lambda_{21}$, $\lambda_{22}$, $\lambda_{31}$, $\lambda_{32}$, $\lambda_{41}$, and $\lambda_{42}$. Here, the wavelengths of optical signals $\lambda_{11}$ and $\lambda_{12}$ comprise the first waveband; the wavelengths of optical signals $\lambda_{21}$ and $\lambda_{22}$ comprise the second waveband; the wavelengths of optical signals $\lambda_{31}$ and $\lambda_{32}$ comprise the third waveband; and the wavelengths of optical signals $\lambda_{41}$ and $\lambda_{42}$ comprise the fourth waveband. These eight optical signals may be referred to jointly as optical signals $\lambda_{11}$-$\lambda_{42}$, or the "input optical signals."

In certain examples, optical signals $\lambda_{11}$-$\lambda_{42}$ may pass through optical filters (not depicted). As described above, these optical filters may determine/define the spectrum of wavelengths included in a CWDM passband for a given CWDM waveband. Said differently, a CWDM passband for a given CWDM waveband may refer to the spectrum of wavelengths which can transmit through an optical filter without attenuation. In various examples, the optical filters used in conjunction with waveband light source 200 may be readily available optical filters used with existing CWDM-4 technologies.

After passing through optical filters, optical signals $\lambda_{11}$-$\lambda_{42}$ may be transmitted to star coupler 220 via individual waveguides (i.e., input waveguides to star coupler 220). These waveguides may be constructed using readily available optical elements (e.g., fiber to chip couplers, optical waveguides, etc.) found in silicon photonic foundry process design kits.

Star coupler 220 may be any device (or combination of devices) which takes a given input signal and splits the signal into multiple output signals. As will be described in greater detail in conjunction with FIGS. 3-5, this star coupler 220 may be a single multimode interference device (MMI), or a combination of MMIs (e.g., cascaded MMIs). As used herein, an MMI may refer to a micro-scale structure which splits or combines optical signals (and their respective powers) in a predictable way.

Star coupler 220 may split each of the input optical signals into eight output optical signals. For example, star coupler 220 may split optical signal $\lambda_{11}$ into eight output optical signals: $\lambda_{11(a)}$, $\lambda_{11(b)}$, $\lambda_{11(c)}$, $\Delta_{11(d)}$, $\lambda_{11(e)}$, $\lambda_{11(f)}$, $\lambda_{11(g)}$, $\lambda_{11(h)}$ (these optical signals may be referred to as optical signals $\lambda_{11(a-h)}$, or "the output optical signals of input optical signal $\lambda_{11}$"). As depicted, each of optical signals $\lambda_{11(a-h)}$ may be transmitted onto one of the eight output waveguides from star coupler 220. In splitting optical signal $\lambda_{11}$ into eight output optical signals, star coupler 220 splits the optical power of Au eights ways. Said differently, the power split ratio between input optical signal $\lambda_{11}$ and each of its associated output signals is 1:8. Optical signals $\lambda_{12}$-$\lambda_{42}$ may be split in the same/similar fashion as optical signal $\lambda_{11}$.

Aside from splitting each of the input optical signals into eight output optical signals, star coupler 220 may also combine (i.e., multiplex) optical signals onto common output waveguides. For example, star coupler 220 may combine output optical signals $\lambda_{11(a)}$, $\lambda_{12(a)}$, $\lambda_{21(a)}$, $\lambda_{22(a)}$, $\lambda_{31(a)}$, $\lambda_{32(a)}$, $\lambda_{41(a)}$, and $\lambda_{42(a)}$ onto the first output waveguide. In the same/similar manner, star coupler 220 may combine: output optical signals $\lambda_{11(b)}$, $\lambda_{12(b)}$, $\lambda_{21(b)}$, $\lambda_{22(b)}$, $\lambda_{31(b)}$, $\lambda_{32(b)}$, $\lambda_{41(b)}$, and $\lambda_{42(b)}$ onto the second output waveguide; output optical signals $\lambda_{11(c)}$, $\lambda_{12(c)}$, $\lambda_{21(c)}$, $\lambda_{22(c)}$, $\lambda_{31(c)}$, $\lambda_{32(c)}$, $\lambda_{41(c)}$, and $\lambda_{42(c)}$ onto the third output waveguide; etc. As described above, each of these output optical signals may be a power reduced version of one of the input optical signals. For example: output optical signals $\lambda_{11(a)}$, $\lambda_{11(b)}$, and $\lambda_{11(c)}$ are power reduced versions of input optical signal $\lambda_{11}$; output optical signals $\lambda_{12(a)}$, $\lambda_{12(b)}$, and $\lambda_{12(c)}$ are power reduced versions of input optical signal $\lambda_{12}$; output optical signals $\lambda_{21(a)}$, $\lambda_{21(b)}$, and $\lambda_{21(c)}$ are power reduced versions of input optical signal $\lambda_{21}$; etc. Accordingly, each of the eight waveguides exiting star coupler 220 may receive/transmit a power reduced version of each of the eight input optical signals.

In summary, star coupler 220 may (1) split each of the input optical signals into eight, power-reduced output optical signals; and (2) combine the power-reduced output optical signals corresponding to each of the input optical signals, onto common waveguides. Accordingly, each of the eight waveguides exiting from star coupler 220 may receive/transmit a single light beam comprised of eight output optical signals. Each of these eight output optical signals may be a power-reduced version of one of the input optical signals (i.e. optical signals $\lambda_{12}$-$\lambda_{42}$). As will be described in greater detail below, each of these eight output waveguides may connect to a separate waveband transmitter. A given waveband transmitter may modulate the eight optical signals (of different wavelengths) which it receives. Thus, the aggregate output signals from these eight waveband transmitters may be 64 modulated optical signals (i.e., eight waveband transmitters×eight optical signals per waveband transmitter). As described above, modulating an optical signal may comprise imparting data into that signal. Thus, the four laser arrays of waveband light source 200 may be used to simultaneously produce 64 optical signals capable of carrying data. This ratio 16:1 ratio between the number of produced optical signals and the number of laser arrays may be extremely attractive to certain customers.

As described above, waveband light source 200 may operate in two modes. In the first mode, waveband light source 200 may be backwards compatible with existing CWDM-4 technologies. In particular, one laser per laser array may be switched off (or obstructed, etc.) so that each laser array only produces optical signals of a single wavelength per CWDM-4 passband. Accordingly, in this first mode, the four laser arrays of waveband light source 200 may be used to simultaneously produce/transmit 32 optical signals capable of carrying data (i.e., four input optical signals split onto eight different output waveguides). By contrast, in the second mode, all the lasers may be switched "on" (e.g., may be unobstructed, etc.). Accordingly, waveband light source 200 may be used to simultaneously produce/transmit 64 optical signals capable of carrying data.

Figure 3:
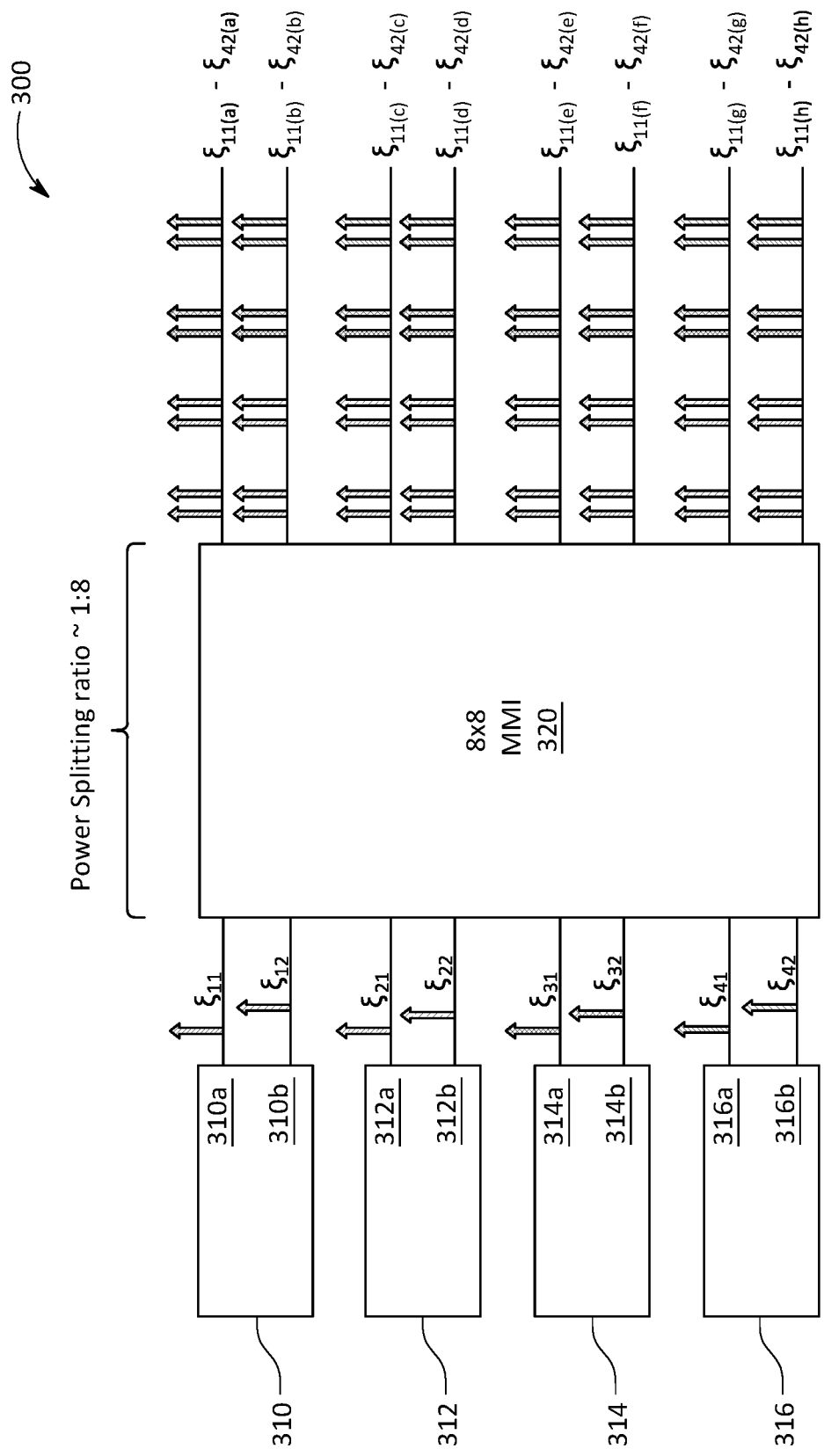
FIG. 3 depicts another example waveband light source, in accordance with various examples of the presently disclosed technology.

FIG. 3 depicts another example waveband light source, in accordance with various examples of the presently disclosed technology. Waveband light source 300 includes four laser arrays, an 8×8 multimode interference device (MMI), eight input waveguides which connect the laser arrays to the 8×8 MMI, and eight output waveguides from the 8×8 MMI.

FIG. 3 may be the same/similar as FIG. 2 except that the generic star coupler of FIG. 2 has been replaced by 8×8 MMI 320. As described above, an MMI may refer to a micro-scale structure which splits or combines optical signals (and their power) in a predictable way. Like star coupler 220 of FIG. 2, 8×8 MMI 320 has eight inputs, and eight outputs (thus the 8×8 prefix), and combines power reduced versions of each of the input optical signals it receives (i.e., optical signals $\xi_{11}$-$\xi_{42}$) onto eight different output waveguides. Accordingly, like waveband light source 200, waveband light source 300 may produce/transmit 64 optical signals capable of carrying data.

Figure 4:
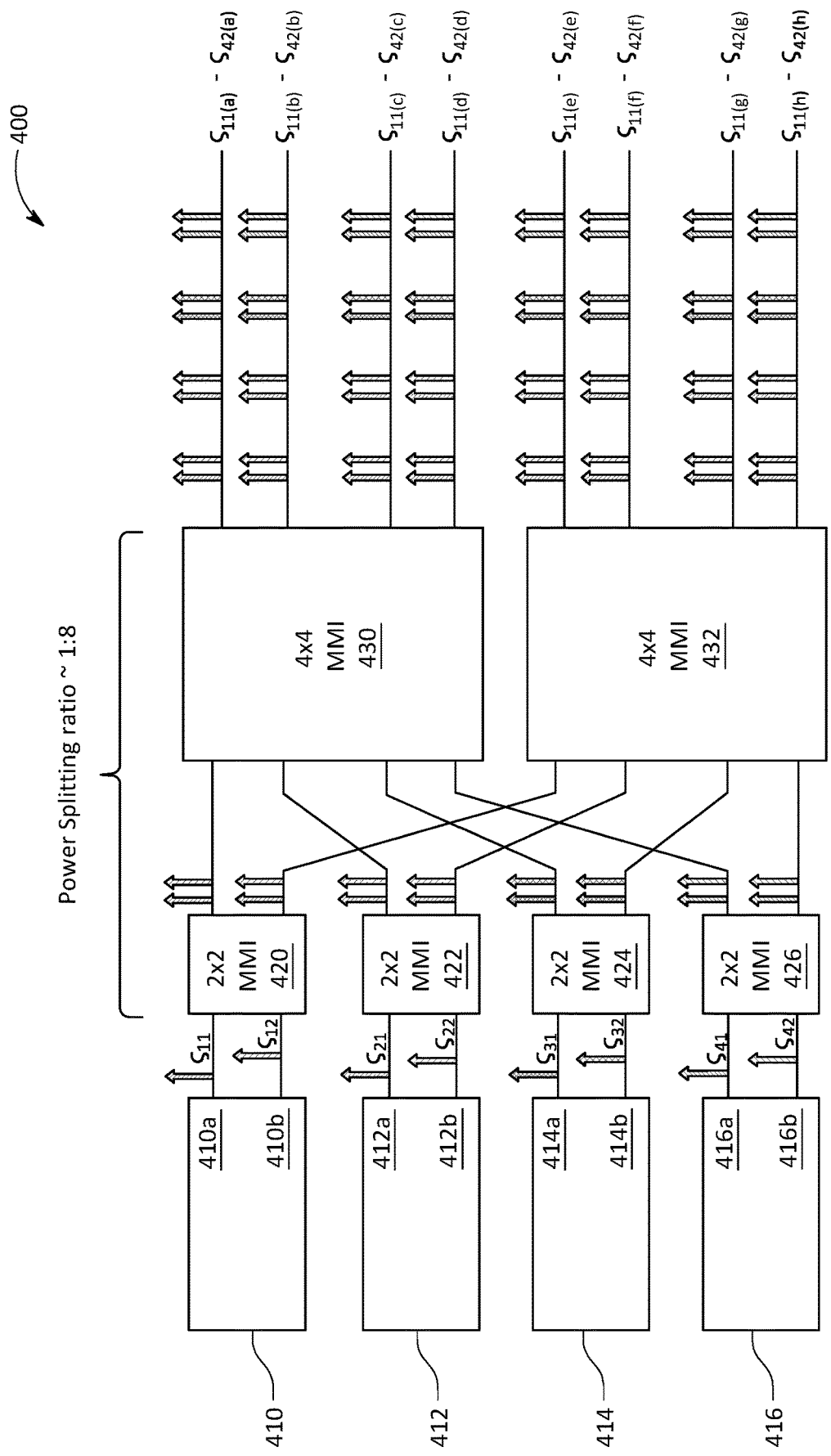
FIG. 4 depicts another example waveband light source, in accordance with various examples of the presently disclosed technology.

FIG. 4 depicts another example waveband light source, in accordance with various examples of the presently disclosed technology. Waveband light source 400 includes four laser arrays, four 2×2 MMIs, two 4×4 MMIs, and various waveguides which connect the aforementioned components.

Here, the combination of the six MMIs which comprise waveband light source 400 operates in the same/similar manner as star coupler 220 and 8×8 MMI 320 of FIGS. 2 and 3, respectively. In particular, the combination of MMIs (which may be referred to as cascaded MMIs) combines power-reduced versions of each of the input optical signals produced by laser arrays 410, 412, 414, and 416 onto eight different output waveguides which exit the two 4×4 MMIs. Said differently, each of the eight final output waveguides of the cascaded MMI combination may receive/transmit a single light beam comprised of eight output optical signals, wherein each of the eight output optical signals is a power-reduced version of one of input optical signals $\xi_{11}$-$\xi_{42}$. Accordingly, like waveband light sources 200 and 300, waveband light source 400 may produce 64 optical signals capable of carrying data.

In various examples, the cascaded MMI architecture of FIG. 4 may be preferable to the single 8×8 MMI architecture of FIG. 3 because the cascaded MMI architecture of FIG. 4 may have a smaller/shorter physical profile.

Figure 5:
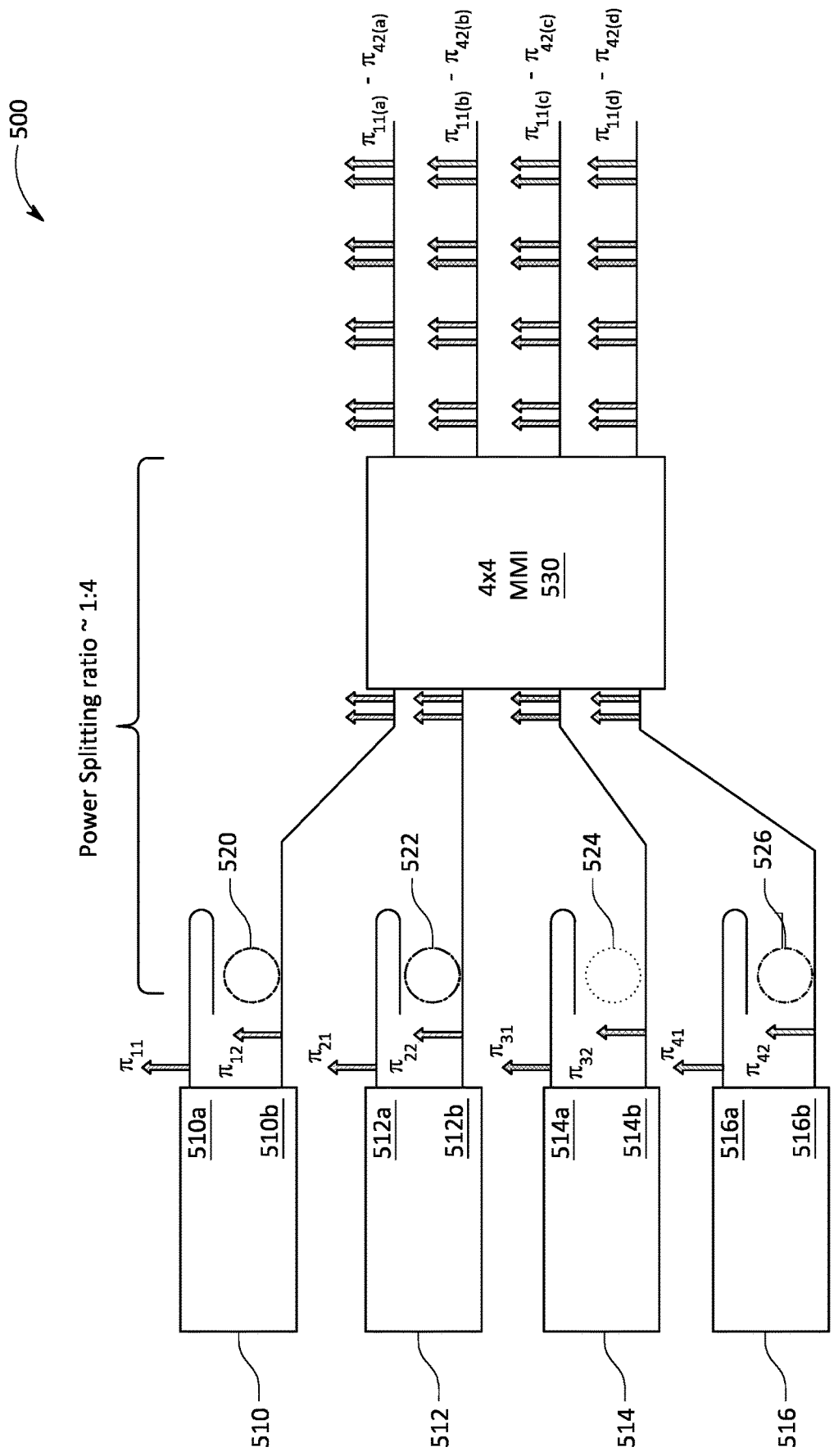
FIG. 5 depicts another example waveband light source, in accordance with various examples of the presently disclosed technology.

FIG. 5 depicts another example waveband light source, in accordance with various examples of the presently disclosed technology. Waveband light source 500 includes four laser arrays, four microring resonators, a 4×4 MMI, and various waveguides.

A microring resonator may refer to a closed-loop waveguide which couples an input waveguide to an output waveguide. Here, a given microring resonator couples a waveguide which carries optical signals produced by a first laser of a laser array to a waveguide which carries optical signals produced by a second laser of the laser array. Said differently, the microring resonators couple waveguides of a common waveband. Similar to the other components described above, these microring resonators may be constructed/sourced from readily available silicon photonic foundry process design kits or custom designed based on a process design kit.

In the example of waveband light source 500, the four microring resonators may act as drop filters for optical signals of certain wavelengths. For example, microring resonator 520 may be tuned to "drop" optical signals of the wavelength produced by laser 510a (e.g., optical signal $\pi_{11}$). Microring resonator 520 may also be tuned to allow optical signals of other wavelengths to pass undisturbed. Accordingly, microring resonator 520 may "drop" optical signal m1 onto the waveguide which carries optical signal $\pi_{12}$ while allowing optical signal $\pi_{12}$ to pass undisturbed. These two optical signals (which, as described above, may comprise a first CWDM waveband) may then be carried on a common waveguide to 4×4 MMI 530. Microring resonators 522, 524, and 526 may be tuned in the same/similar fashion. Accordingly, 4×4 MMI 530 may have four input waveguides. As described above, each of the waveguides which enter 4×4 MMI 530 may carry optical signals of a common CWDM waveband.

4×4 MMI 530 has four input waveguides, and four output waveguides (thus the 4×4 prefix). Accordingly, 4×4 MMI 530 functions somewhat differently than star coupler 220, 8×8 MMI 320, and the cascaded MMI combination of FIG. 4. In particular, 4×4 MMI 530 combines power reduced versions of the input optical signals produced by laser arrays 510, 512, 514, and 516 onto four different output waveguides. Said differently, each of input optical signals $\pi_{11}$-$\pi_{42}$ are only split into four output signals (whereas in FIGS. 2-4 each input signal was split into eight output signals). Because each input signal is only split into four output signals, the power splitting ratio between input and output signals is only 1:4. This lower power splitting ratio may be preferred in applications which require higher power optical signals at the detection stage. Unlike waveband light sources 200, 300, and 400, which may produce/transmit 64 optical signals, waveband light sources 500 may only produce 32 optical signals capable of carrying data. Accordingly, light sources such as waveband light source 500 may trade off data transmission density in order to maintain higher power optical signals.

Figure 6:
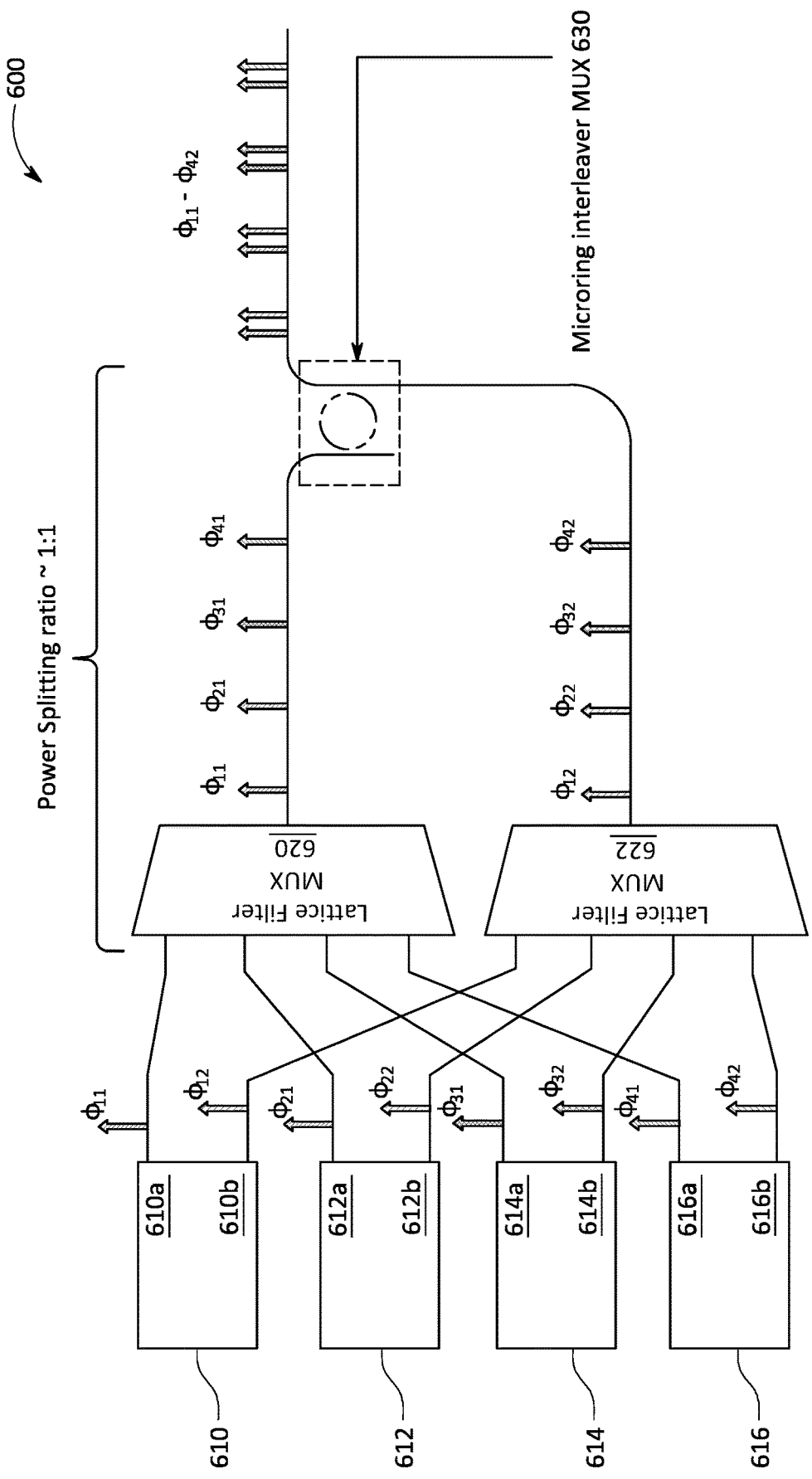
FIG. 6 depicts another example waveband light source, in accordance with various examples of the presently disclosed technology.

FIG. 6 depicts another example waveband light source, in accordance with various examples of the presently disclosed technology. Waveband light source 600 includes four laser arrays, two multiplexers (MUXs), a microring interleaver MUX, and various waveguides which connect the aforementioned components.

As depicted, laser array 610 may produce optical signals of a first waveband. In particular, laser 610a may produce optical signals of a first wavelength of the first waveband (e.g., optical signal $\phi_{11}$), and laser 610b may produce optical signals of a second wavelength of the first waveband (e.g., optical signal $\phi_{12}$). Here, optical signals of the first wavelength of the first waveband (e.g., optical signal $\phi_{11}$) may be carried to MUX 620, and optical signals of the second wavelength of the first waveband (e.g., optical signal $\phi_{12}$) may be carried to MUX 622. In the same/similar fashion, optical signals of the first wavelength of the second waveband (e.g., optical signal $\phi_{21}$) may be carried to MUX 620, and optical signals of the second wavelength of the second waveband (e.g., optical signal $\phi_{22}$) may be carried to MUX 622. In the same/similar fashion, optical signals of the first wavelength of the third waveband (e.g., optical signal $\phi_{31}$) may be carried to MUX 620, and optical signals of the second wavelength of the third waveband (e.g., optical signal $\phi_{32}$) may be carried to MUX 622. In the same/similar fashion, optical signals of the first wavelength of the fourth waveband (e.g., optical signal $\phi_{41}$) may be carried to MUX 620, and optical signals of the second wavelength of the second waveband (e.g., optical signal $\phi_{42}$) may be to MUX 622. In summary, MUX 620 may receive optical signals of the first wavelength of the CWDM wavebands (which may be referred to as the "odd optical signals") and MUX 622 may receive optical signals of the second wavelength of the CWDM wavebands (which may be referred to as the "even optical signals").

As described above, a multiplexer (or MUX) may refer to an optical device which combines multiple optical signals of different wavelengths onto common optical fibers/waveguides (said differently, a MUX may combine optical signals of different wavelengths into a common light beam, which may be transmitted along a single waveguide). Accordingly, MUXs 620 and 622 may combine the optical signals of different wavelengths they receive onto common waveguides. In particular, MUX 620 may combine odd optical signals (e.g., optical signals $\phi_{11}$, $\phi_{21}$, $\phi_{31}$, $\phi_{41}$) onto a first common waveguide. MUX 622 may combine even optical signals (e.g., optical signals $\phi_{12}$, $\phi_{22}$, $\phi_{32}$, $\phi_{42}$) onto a second common waveguide. Here, because none of the optical signals are being split by MUXs 620 and 622, the optical signals output from the MUXs are not reduced in power. Said differently, the power splitting ratio is 1:1 for MUXs 620 and 622.

MUXs 620 and 622 may be various types of MUXs. In certain embodiments, MUXs 620 and 622 may be lattice filter MUXs or arrayed waveguide grating (AWG) MUXs which can be constructed/sourced/designed from readily available silicon photonic foundry process design kits.

The waveguides exiting from MUXs 620 and 622 respectively each lead to microring interleaver MUX 630. A microring interleaver MUX may be an optical device which combines even multiplexed optical signals with odd multiplexed optical signals, onto a common fiber/waveguide. Similar to the microring resonators of FIG. 5, microring interleaver MUX 630 may act as a drop filter for optical signals of certain wavelengths. In particular, microring interleaver MUX 630 may be tuned to "drop" odd optical signals (e.g., optical signals $\phi_{11}$, $\phi_{21}$, $\phi_{31}$, $\phi_{41}$) onto the waveguide which carries even optical signals—while allowing even optical signals (e.g., optical signals $\phi_{12}$, $\phi_{22}$, $\phi_{32}$, $\phi_{42}$) to pass undisturbed. In this way, microring interleaver MUX 630 may combine odd and even optical signals (e.g., optical signals $\phi_{11}$-$\phi_{42}$) onto a single output waveguide.

In certain examples, microring interleaver MUX 630 may have a periodic Free Spectrum Range (FSR). This FSR may allow microring interleaver MUX 630 to "drop" optical signals of wavelengths spaced a certain spacing apart. For example, lasers 610*a*, 612*a*, 614*a*, and 616*a* may be calibrated to produce "odd" wavelengths of light spaced approximately 20 nm apart. Accordingly, the FSR of microring interleaver MUX 630 may be tuned to "drop" optical signals of these odd, periodically spaced wavelengths. In certain embodiments, the interleaver MUX may be constructed from one or more microrings, Mach Zhender interferometers, etc.

Figure 7:
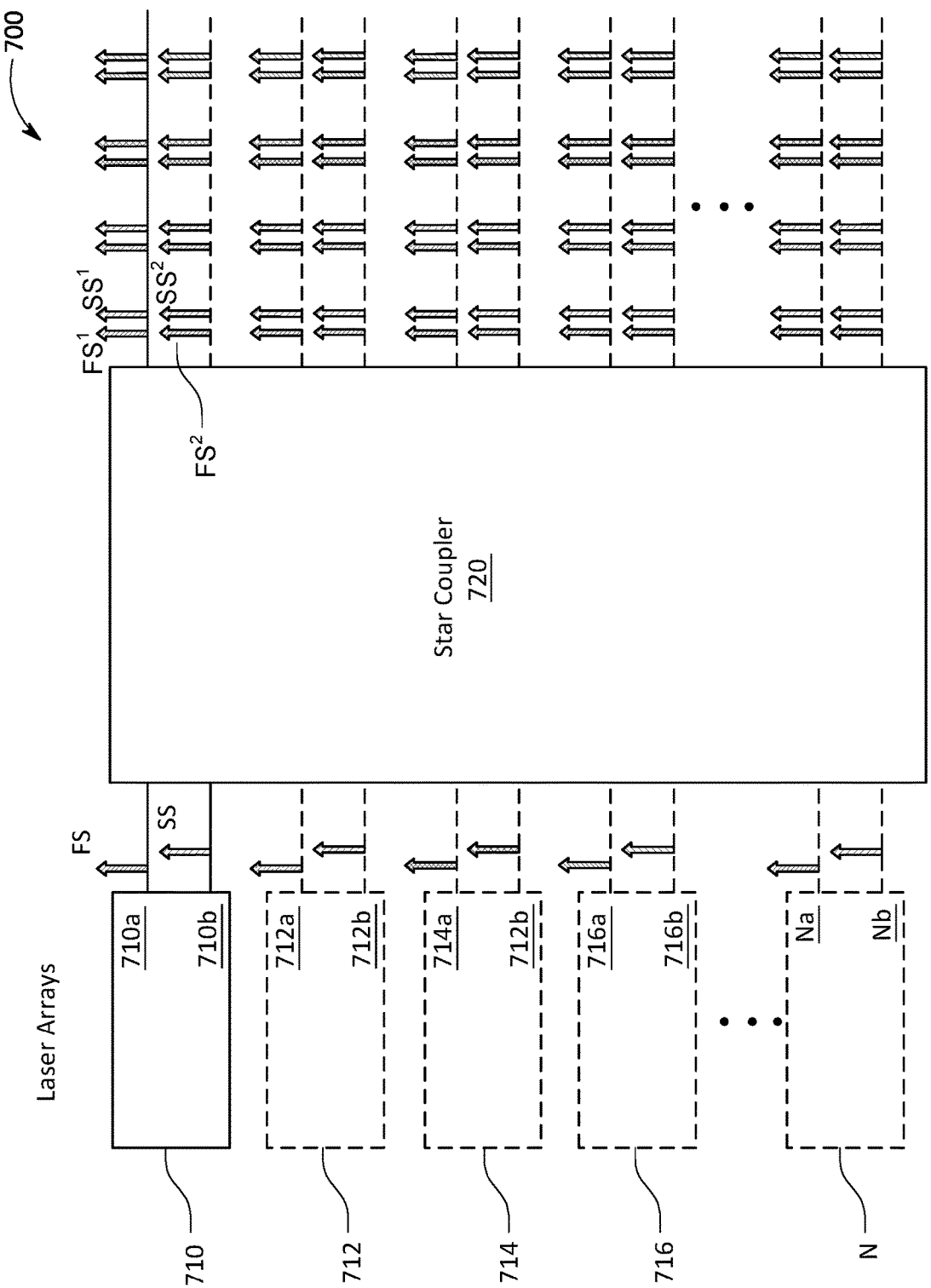
FIG. 7 depicts another example waveband light source, in accordance with various examples of the presently disclosed technology.

FIG. 7 depicts another example waveband light source, in accordance with various examples of the presently disclosed technology. Waveband light source 700 may be viewed as a generic waveband light source from which waveband light sources 200-600 may be derived.

Waveband light source 700 includes at least a first laser array, laser array 710, although waveband light source 700 may include any number of laser arrays. For example, waveband light source 700 may also include a second laser array (e.g., laser array 712), a third laser array (e.g., laser array 714), and a fourth laser array (e.g., laser array 716).

Laser array 710 may be any laser array which emits optical signals of at least a first and second wavelength within a first CWDM passband. As described above, the first CWDM passband may be a spectrum of wavelengths that includes a CWDM wavelength, which can pass through an optical filter. In certain examples, the first CWDM passband may include a CWDM-4 wavelength. In some of these examples, the first CWDM passband may include the first CWDM-4 wavelength (i.e., approximately 1271 nm).

Laser array 710 may be an arrangement of two or more lasers on a single physical structure, such as a silicon or InP chip. Accordingly, a first laser of laser array 710 (e.g., laser 710*a*) may emit optical signals of the first wavelength within the first CWDM passband. A second laser of laser array 710 (e.g., laser 710*b*) may emit optical signals of the second wavelength within the first CWDM passband. In certain examples, laser array 710 may include additional lasers which emit optical signals of, e.g., a third wavelength within the first CWDM passband; a fourth wavelength within the first CWDM passband, etc. In various examples, laser array 710 may be constructed using readily available CWDM-4 distributed feedback lasers found in silicon photonic foundry process design kits.

As described above, waveband light source 700 may have a first and second mode. In the first mode, laser array 710 may emit optical signals of only the first wavelength within the first CWDM passband (e.g., laser 710*b* may be switched off, obstructed, etc.). Accordingly, when in this first mode, waveband light source 700 may operate with existing CWDM technologies which only operate with a single wavelength per CWDM passband. In the second mode, laser array 710 may emit optical signals of at least the first and second wavelength within the first CWDM passband. In this second mode, waveband light source 700 may operate with other waveband devices to increase the number of wavelength transmission channels for CWDM technologies.

In various examples, waveband light source 700 may include star coupler 720. As described above, star coupler 720 may be any device (or combination of devices) which takes a given input signal, and splits it into multiple output signals. Accordingly, star coupler 720 may comprise any one, or combination of: one or more multimode interference devices (MMIs); one or more optical multiplexers (e.g., microring resonators/drop filters, lattice filter multiplexers, microring interleaver multiplexers, arrayed waveguide gratings, echelle gratings, etc.); and one or more optical demultiplexers (e.g., microring resonators/drop filters, lattice filter demultiplexers, microring interleaver demultiplexers, arrayed waveguide gratings, echelle gratings, etc.)

Accordingly, when waveband light source 700 is operating in the second mode, star coupler 720 may receive, from a first input waveguide, a first optical signal (FS). FS may be of the first wavelength within the first CWDM passband. Similarly, star coupler 720 may receive, from a second input waveguide, a second optical signal (SS). SS may be of the second wavelength within the first CWDM passband. Star coupler 720 may receive the FS and SS in any of the manners described in conjunction with FIGS. 2-6. Star coupler 720 may also receive the optical signals in other manners.

Upon receipt of FS and SS, star coupler 720 may combine versions of FS and SS onto a common waveguide. Said differently, star coupler 720 may combine a first version of FS (i.e., $FS^1$) with a first version of SS (i.e., $SS^1$)—onto a first output waveguide. In various examples, $FS^1$ may be identical to FS. In other examples $FS^1$ may be a power reduced version of FS. $SS^1$ may be related to SS in the same/similar manner.

In certain embodiments, star coupler 720 may combine first versions of additional optical signals onto the first output waveguide. For example, laser array 712 may emit optical signals of a first and second wavelength within a second CWDM passband (i.e., a second CWDM waveband). Accordingly, star coupler 720 may combine all of the following onto the first output waveguide: $FS^1$ (which is the first wavelength within the first CWDM passband); $SS^1$ (which is the second wavelength within the first CWDM passband); a first version of a third optical signal (which may be the first wavelength within the second CWDM passband); and a first version of a fourth optical signal (which may be the second wavelength within the second CWDM passband); etc.

Star coupler 720 may combine these optical signals in any of the manners described in conjunction with FIGS. 2-6. Star coupler 720 may also combine these optical signals in other manners.

In various examples, star coupler 720 may split power reduced versions of FS (as well as other optical signals) onto two or more output waveguides. For example, star coupler 720, may split a first power-reduced version of FS (e.g., $FS^1$) onto the first output waveguide, and a second power-reduced version of FS (e.g., $FS^2$) onto a second output waveguide. In various examples, the first power-reduced version of the first optical signal (e.g., $FS^1$) and the second power-reduced version of the first optical signal (e.g., $FS^2$) may be identical.

In the same/similar manner, star coupler 720 may split power-reduced versions of other received optical signals onto the first and second output waveguides. In certain examples, star coupler 720 may split power-reduced versions of the received optical signals onto additional output waveguides (e.g., a third output waveguide, a fourth output waveguide, etc.). Star coupler 720 may split the power-reduced versions of the input/received optical signals in any of the manners described in conjunction with FIGS. 2-6. Star coupler 720 may also split the optical signals in other manners.

In certain examples, waveband light source 700 (as well as waveband light sources 200-600) may include one or more optical modulators calibrated/tuned to modulate optical signals of the emitted wavelengths. As will be described in greater detail in conjunction with FIGS. 8-12, an optical modulator may be an optical device which imparts data onto an optical signal by modulating the optical signal. An optical modulator may be calibrated to modulate optical signals of a certain wavelength. For example, a first optical modulator may be calibrated/tuned to modulate optical signals of the first wavelength within the first CWDM passband. Similarly, a second optical modulator may be calibrated/tuned to modulate optical signals of the second wavelength within the first CWDM passband.

The optical modulators included in waveband light source 700 may be various types of optical modulators. For example, if waveband light source 700 emits optical signals, which comprise CWDM-4 wavebands, waveband light source 700 may utilize readily available directly modulated lasers, electro-absorption modulated lasers, and other optical modulators used with existing CWDM-4 technologies. In some examples, the optical modulators may be microring modulators. In other examples, they may be Mach Zehnder modulators.

In certain examples, waveband light source 700 (or more specifically its lasers and optical modulators) may modulate optical signals before they enter star coupler 720 or after they exit star coupler 720. In other examples, optical modulators may be incorporated into star coupler 720. In further examples, the optical signals produced by waveband light sources 700 may be modulated external to waveband light source 700. Accordingly, FIGS. 8-12 describe examples of waveband transmitters which may externally modulate the optical signals produced by waveband light sources 200-700.

Figure 8:
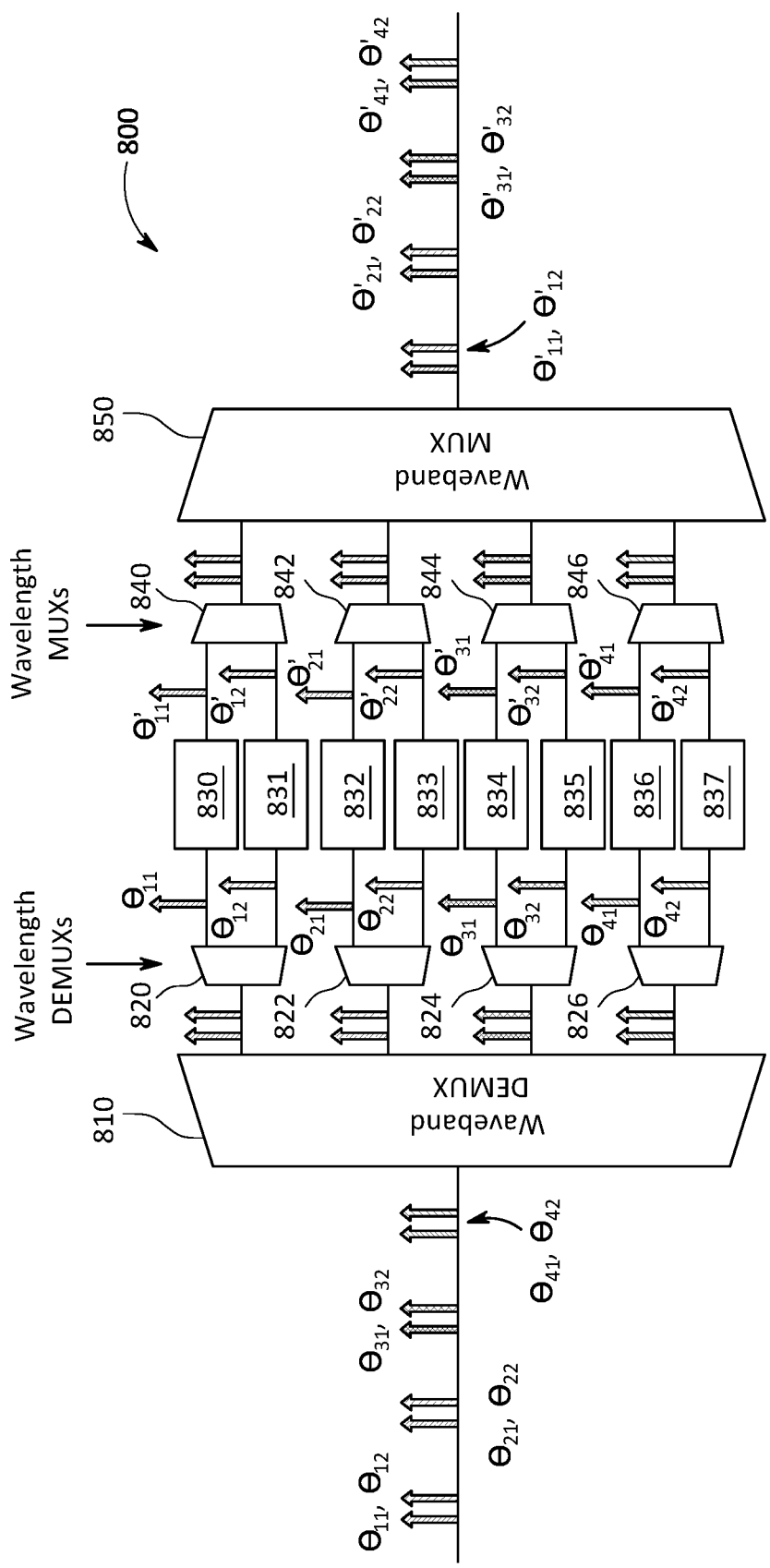
FIG. 8 depicts an example waveband transmitter, in accordance with various examples of the presently disclosed technology.

FIG. 8 depicts an example waveband transmitter, in accordance with various examples of the presently disclosed technology. Waveband transmitter 800 includes one waveband demultiplexer (DEMUX), four wavelength DEMUXs, eight optical modulators, four wavelength multiplexers (MUXs), one waveband MUX, and various waveguides which connect the aforementioned optical components.

In general, a waveband transmitter may receive optical signals of one or more CWDM wavebands on a common waveguide. These wavebands may be comprised of two or more wavelengths.

Here, waveband transmitter 800 may receive eight optical signals of eight different wavelengths on a single input waveguide (i.e., optical signals $\theta_{11}$, $\theta_{12}$, $\theta_{21}$, $\theta_{22}$, $\theta_{31}$, $\theta_{32}$, $\theta_{41}$, $\theta_{42}$). These eight different wavelengths may comprise four CWDM wavebands of two wavelengths each. For example, the wavelengths of optical signals $\theta_{11}$ and $\theta_{12}$ may comprise a first CWDM waveband; the wavelengths of optical signals $\theta_{21}$ and $\theta_{22}$ may comprise a second CWDM waveband; the wavelengths of optical signals $\theta_{31}$ and $\theta_{32}$ may comprise a third CWDM waveband; and the wavelengths of optical signals $\theta_{41}$ and $\theta_{42}$ may comprise a fourth CWDM waveband. In various examples, these CWDM wavebands may be CWMD-4 wavebands. In other examples, waveband transmitter 800 may receive optical signals of a different number of CWDM wavebands (e.g., optical signals of two wavebands, three wavebands, five wavebands, etc.). Similarly, the CWDM wavebands may be comprised of additional wavelengths (e.g., three wavelengths per CWDM waveband, four wavelengths per CWDM waveband, etc.).

In the specific example of FIG. 8, waveband transmitter 800 receives optical signals of four CWDM wavebands, where each CWDM waveband is comprised of two wavelengths. Said differently, waveband transmitter 800 may receive eight optical signals on a single input waveguide. Accordingly, waveband transmitter 800 may operate with any of the waveband light sources described in conjunction with FIGS. 2-7. As a reminder from above, each of these waveband light sources could produce eight optical signals (comprising four CWDM wavebands of two wavelengths each) onto at least one common output waveguide.

As depicted, optical signals $\theta_{11}$-$\theta_{42}$ are received by waveband transmitter 800 and carried to waveband DEMUX 810.

As a reciprocal device to an optical MUX, an optical DEMUX (such as waveband DEMUX 810) may split a multiplexed light beam into two or more light beams based on wavelength/waveband. Said differently, an optical DEMUX may receive multiple optical signals of different wavelengths/wavebands traveling on a common waveguide, and split the optical signals according to wavelength/waveband onto separate waveguides. As used herein, a waveband demultiplexer (such as waveband DEMUX 810) may refer to an optical demultiplexer which splits an input light beam by waveband. For example, a waveband demultiplexer may split an input light beam comprised of optical signals of multiple wavebands, into separate light beams comprised of optical signals of the individual wavebands. In some examples, a wavelength demultiplexer may refer to an optical demultiplexer which splits a light beam by wavelength. For example, a wavelength demultiplexer may split a light beam comprised of optical signals of multiple wavelengths, into separate lights beams comprised of optical signals of a single wavelength. The waveband and wavelength demultiplexers may be, but not limited to, lattice filter demultiplexers, echelle gratings and arrayed waveguide gratings which can be constructed/sourced from readily available silicon photonic foundry process design kits.

Here, waveband DEMUX 810 may split optical signals $\theta_{11}$-$\theta_{42}$ by CWDM waveband onto four separate waveguides (i.e., waveband DEMUX 810 may split the received single light beam into four CWDM wavebands). In particular, waveband DEMUX 810 may split optical signals $\theta_{11}$ and $\theta_{12}$ onto a first waveguide; optical signals $\theta_{21}$ and $\theta_{22}$ onto a second waveguide; optical signals $\theta_{31}$ and $\theta_{32}$ onto a third waveguide; and optical signals $\theta_{41}$ and $\theta_{42}$ onto a fourth output waveguide.

Once split into wavebands, optical signals $\theta_{11}$-$\theta_{42}$ may be further split into individual wavelengths by wavelength DEMUXs 820-826. Accordingly, each of optical signals $\theta_{11}$-$\theta_{42}$ may be split onto separate waveguides based on their respective wavelengths. These waveguides may carry the optical signals to optical modulators 830-837.

As described above, an optical modulator may be an optical device which imparts data onto an optical signal by modulating the optical signal. Each optical modulator may be calibrated to modulate optical signals of a certain wavelength. For example, optical modulator 830 may be calibrated to modulate optical signals of optical signal $\theta_{11}$'s wavelength, optical modulator 831 may be calibrated to modulate optical signals of optical signal $\theta_{12}$'s wavelength, etc. Accordingly, optical modulators 830-837 may impart separate packets of data onto optical signals $\theta_{11}$-$\theta_{42}$, respectively. These modulated optical signals may be represented as optical signals $\theta'_{11}$, $\theta'_{12}$, $\theta'_{21}$, $\theta'_{31}$, $\theta'_{32}$, $\theta'_{41}$, $\theta'_{42}$ Optical modulators 830-837 may be various types of optical modulators. For example, if optical signals $\theta_{11}$-$\theta_{42}$ comprise CWDM-4 wavebands, optical modulators 830-837 may be readily available optical modulators used with existing CWDM-4 technology. In some examples, optical modulators 830-837 may be microring modulators. In other examples, they may be, but not limited to, Mach Zehnder or electro-absorption modulators.

Modulated optical signals $\theta'_{11}$-$\theta'_{42}$ may be carried to wavelength MUXs 840-846.

As described above, MUXs may refer to optical devices which combine optical signals of different wavelengths onto common waveguides. As used herein, a wavelength multiplexer may refer to an optical multiplexer which combines two or more light beams by wavelength. Said differently, a wavelength multiplexer may combine a first light beam comprised of a first optical signal of a first wavelength with a second light beam comprised of a second optical signal of a second wavelength—into a common light beam. As used herein, a waveband multiplexer may refer to an optical multiplexer which combines two or more light beams by waveband. For example, a waveband multiplexer may combine a first light beam comprised of optical signals of a first CWDM waveband with a second light beam comprised of optical signals of a second CWDM waveband—into a common light beam. The wavelength and waveband multiplexers may be, but not limited to, lattice filter, microring and array waveguide grating multiplexers which can be constructed/sourced from readily available silicon photonic foundry process design kits.

Accordingly, wavelength MUXs 840-846 may combine the modulated optical signals (of different wavelengths) they receive onto a common waveguide. In particular, wavelength MUX 840 may combine modulated optical signals $\theta'_{11}$ and $\theta'_{12}$ onto a first waveguide; wavelength MUX 842 may combine modulated optical signals $\theta'_{21}$ and $\theta'_{22}$ onto a second waveguide; wavelength MUX 844 may combine modulated optical signals $\theta'_{31}$ and $\theta'_{32}$ onto a third waveguide; and wavelength MUX 846 may combine modulated optical signals $\theta'_{41}$ and $\theta'_{42}$ onto a fourth waveguide. Each of these four waveguides may carry modulated optical signals of a common waveband to waveband MUX 850.

Waveband MUX 850 may combine the modulated optical signals of the four wavebands onto a single output waveguide. As will be described below, these modulated optical signals may be carried to a waveband receiver, which operates to detect the modulated optical signals. This may correspond to "reading/extracting" the data imparted onto the modulated optical signals.

Like the waveband light sources described in conjunction with FIGS. 2-6, waveband transmitter 800 may also operate with existing CWDM/CWDM-4 technologies. For example, waveband transmitter 800 may operate with existing CWDM-4 technologies by tuning either the even optical modulators (i.e., optical modulators 830, 832, 834, and 836) or the odd optical modulators (i.e., optical modulators 831, 833, 835, 837) to modulate optical signals of the CWDM-4 wavelengths. Similarly, the DEMUXs and MUXs of waveband transmitter 800 may be calibrated to split or combine optical signals of the CWDM-4 wavelengths. Accordingly, waveband transmitter 800 may operate with existing CWDM-4 technologies, as well as scaled-up technologies which utilize the CWDM wavebands of the present disclosure.

Figure 9:
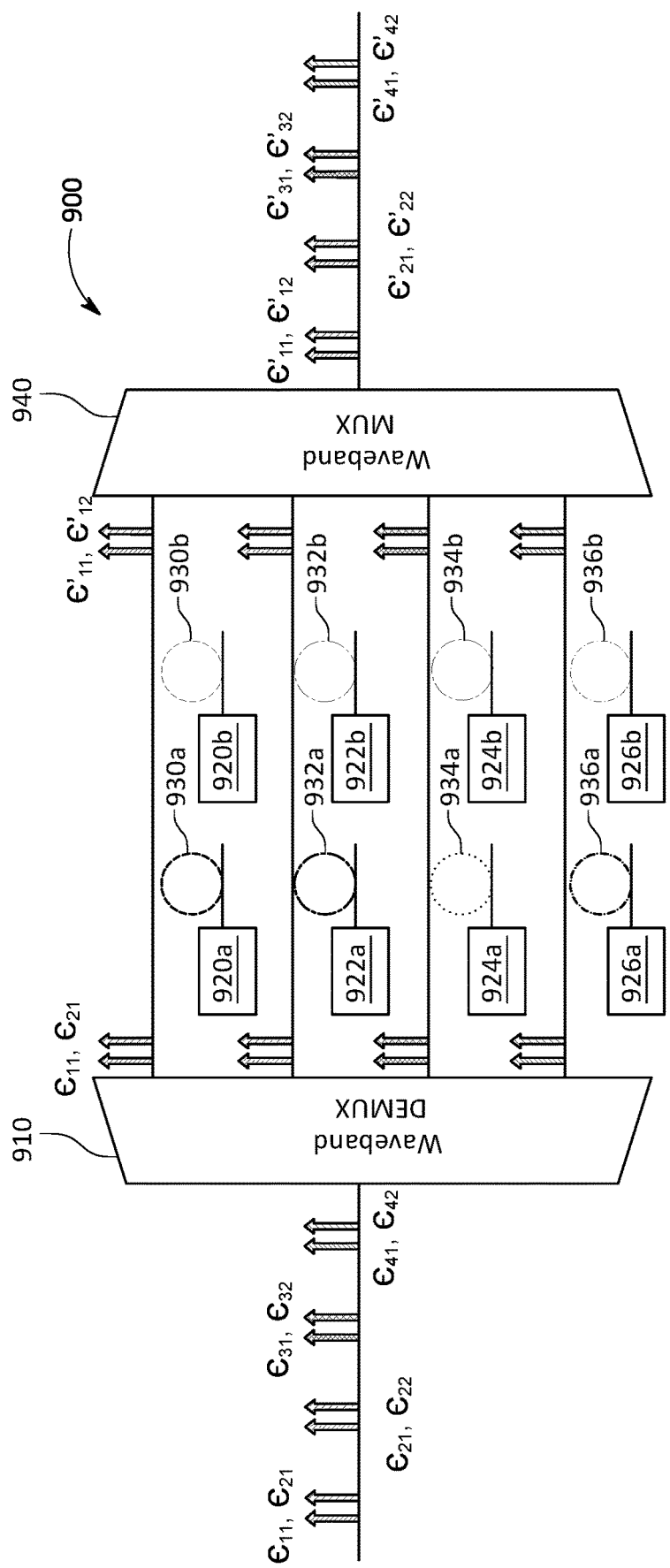
FIG. 9 depicts another example waveband transmitter, in accordance with various examples of the presently disclosed technology.

FIG. 9 depicts another example waveband transmitter, in accordance with various examples of the presently disclosed technology. Waveband transmitter 900 includes one waveband demultiplexer (DEMUX), eight microring modulators, eight monitor photodetectors, one waveband multiplexer (MUX), and various waveguides which connect the aforementioned optical components.

Similar to waveband transmitter 800, waveband transmitter 900 may receive eight optical signals of eight different wavelengths on a single input waveguide (i.e., optical signals $\varepsilon_{11}$, $\varepsilon_{12}$, $\varepsilon_{21}$, $\varepsilon_{22}$, $\varepsilon_{31}$, $\varepsilon_{32}$, $\varepsilon_{41}$, $\varepsilon_{42}$). These eight different wavelengths may comprise four CWDM wavebands, of two wavelengths each. For example, the wavelengths of optical signals $\varepsilon_{11}$ and $\varepsilon_{12}$ may comprise a first CWDM waveband; the wavelengths of optical signals $\varepsilon_{21}$ and $\varepsilon_{21}$ may comprise a second CWDM waveband; the wavelengths of optical signals $\varepsilon_{31}$ and $\varepsilon_{32}$ may comprise a third CWDM waveband; and the wavelengths of optical signals $\epsilon_{41}$ and $\epsilon_{42}$ may comprise a fourth CWDM waveband. These CWDM wavebands may be CWMD-4 wavebands. In other examples, waveband transmitter 900 may receive optical signals of a different number of CWDM wavebands. Similarly, the CWDM wavebands may be comprised of additional wavelengths (e.g., three wavelengths per CWDM waveband, four wavelengths per CWDM waveband, etc.). In general, a waveband transmitter (e.g., waveband transmitter 900) may receive optical signals of one or more CWDM wavebands on a common waveguide. These wavebands may be comprised of two or more wavelengths.

As depicted, optical signals $\epsilon_{11}$-$\epsilon_{42}$ may be received by waveband transmitter 900 and carried to waveband DEMUX 910 (waveband DEMUX 910 may be the same/similar as waveband DEMUX 810). Accordingly, waveband DEMUX 910 may split optical signals $\epsilon_{11}$-$\epsilon_{42}$ according to waveband in the same/similar manner as described in conjunction with FIG. 8 (i.e., waveband DEMUX 910 may split the received single light beam into four CWDM wavebands). In particular, waveband DEMUX 910 may split optical signals $\epsilon_{11}$ and $\epsilon_{12}$ onto a first waveguide; optical signals $\epsilon_{21}$ and $\epsilon_{22}$ onto a second waveguide; optical signals $\epsilon_{31}$ and $\epsilon_{32}$ onto a third waveguide; and optical signals $\epsilon_{41}$ and $\epsilon_{42}$ onto a fourth waveguide.

Microring modulators 930a, 930b, 932a, 932b, 934a, 934b, 936a, and 936b may be coupled to these four waveguides. In particular, microring modulators 930a and 930b may be coupled to the first waveguide, microring modulators 932a and 932b may be coupled to the second waveguide, microring modulators 934a and 934b may be coupled to the third waveguide, and microring modulators 936a and 936b may be coupled to the fourth waveguide.

A microring modulator may be an optical device which imparts data onto an optical signal by modulating the optical signal. Here, each microring modulator may be tuned to modulate optical signals of a certain wavelength, while allowing optical signals of different wavelengths to pass undisturbed. For example, microring modulator 930a may be tuned to modulate optical signals of optical signal $\epsilon_{11}$'s wavelength, while allowing optical signals of other wavelengths (e.g., optical signal $\epsilon_{12}$) to pass undisturbed. Similarly, microring modulator 930b may be tuned to modulate optical signals of optical signal $\epsilon_{12}$'s wavelength, while allowing optical signals of other wavelengths (e.g. optical signal $\epsilon_{11}$) to pass undisturbed. The other microring modulators depicted may be tuned in the same/similar fashion. Accordingly, these eight microring modulators may modulate optical signals $\epsilon_{11}$-$\epsilon_{42}$. These modulated optical signals may be represented as modulated optical signals $\epsilon'_{11}$-$\epsilon'_{42}$. In various embodiments, these microring modulators may be sourced or custom designed from readily available silicon photonic foundry process design kits.

Monitor photodetectors 920a, 920b, 922a, 922b, 924a, 924b, 926a, and 926b may be coupled to microring modulators 930a, 930b, 932a, 932b, 934a, 934b, 936a, and 936b respectively. A monitor photodetector may refer to an optical device which can detect modulated or unmodulated optical signals of a certain wavelength (or wavelengths). For example, monitor photodetector 920a may be tuned to detect optical signals of modulated optical signal $\epsilon_{11}$'s wavelength, photodetector 920b may be tuned to detect modulated optical signals of modulated optical signal $\epsilon'_{12}$'s wavelength, photodetector 922a may be tuned to detect modulated optical signals of optical signal $\epsilon'_{21}$'s wavelength, etc. Here, the monitor photodetectors may be included in waveband transmitter 900 in order to monitor and set the bias point of the modulators. In various embodiments, these monitor photodetectors may be sourced or custom designed from readily available silicon photonic foundry process design kits.

Once modulated, optical signals $\epsilon'_{11}$-$\epsilon'_{42}$ may be carried to waveband MUX 940 (which may be the same/similar as waveband MUX 850). In the same/similar manner as described in conjunction with FIG. 8, waveband MUX 940 may combine the modulated optical signals of the four wavebands onto a single output waveguide. As will be described below, these modulated optical signals may be carried to a waveband receiver, which operates to detect the modulated optical signals. This may correspond to "reading/extracting" the data imparted onto the modulated optical signals.

Similar to waveband transmitter 800, waveband transmitter 900 may also operate with existing CWDM/CWDM-4 technologies. For example, waveband transmitter 900 may be combined with existing CWDM-4 technologies by tuning either the "a" optical ring modulators (i.e., optical ring modulators 930a, 932a, 934a, and 936a) or the "b" optical modulators (i.e., optical ring modulators 930b, 932b, 934b, and 936b) to modulate optical signals of the CWDM-4 wavelengths. Similarly, the waveband DEMUX and waveband MUX of waveband transmitter 900 may be calibrated to split and combine optical signals of the CWDM-4 wavelengths, respectively. Accordingly, waveband transmitter 900 may operate with existing CWDM-4 technologies, as well as scaled-up technologies which utilize the CWDM wavebands of the present disclosure.

Figure 10:
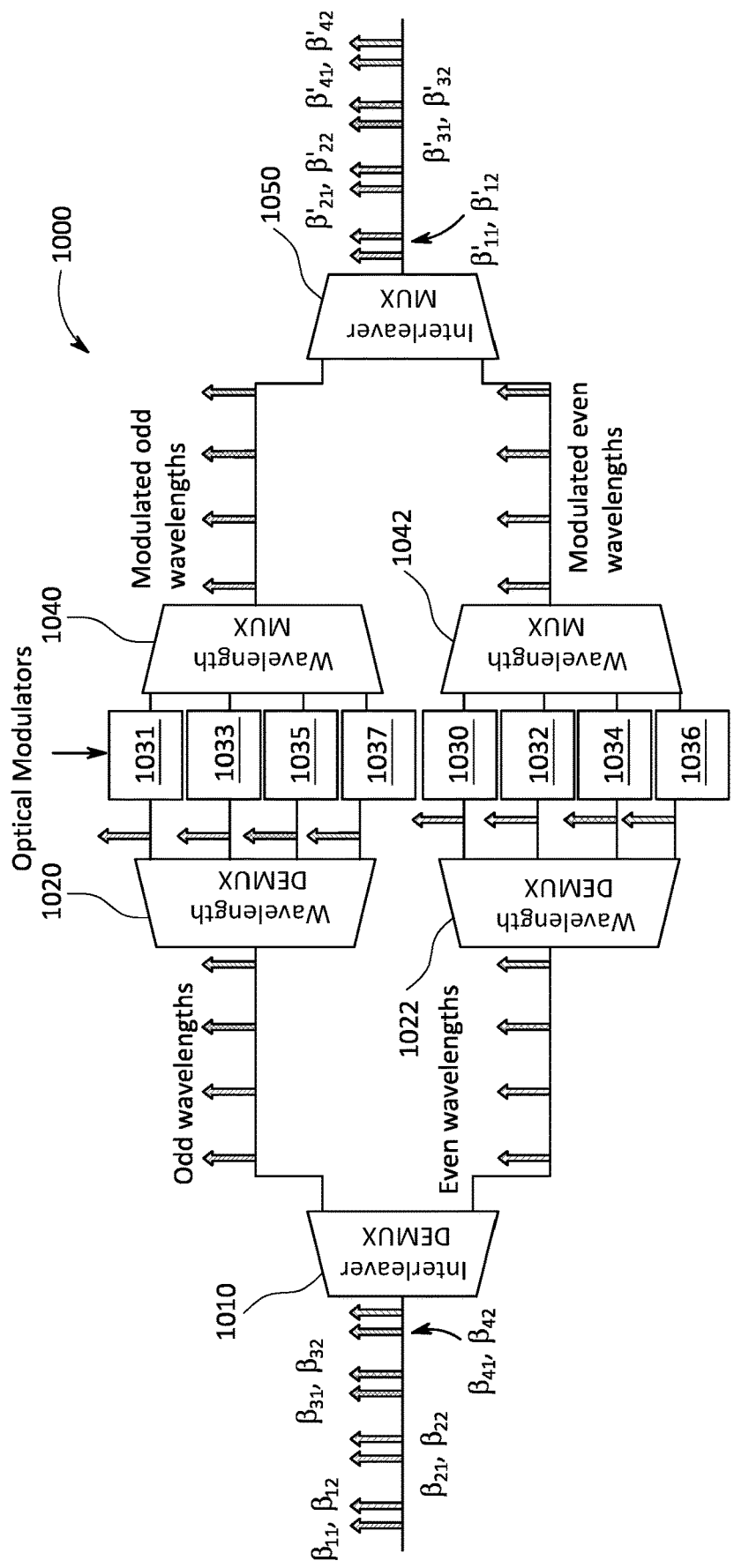
FIG. 10 depicts another example waveband transmitter, in accordance with various examples of the presently disclosed technology.

FIG. 10 depicts another example waveband transmitter, in accordance with various examples of the presently disclosed technology.

Similar to waveband transmitters 800 and 900, waveband transmitter 1000 may receive eight optical signals of eight different wavelengths on a single input waveguide (i.e., optical signals $\beta_{11}$, $\beta_{12}$, $\beta_{21}$, $\beta_{22}$, $\beta_{31}$, $\beta_{32}$, $\beta_{41}$, $\beta_{42}$). These eight different wavelengths may comprise four CWDM wavebands, of two wavelengths each. For example, the wavelengths of optical signals $\beta_{11}$ and $\beta_{12}$ may comprise a first CWDM waveband; the wavelengths of optical signals $\beta_{21}$ and $\beta_{22}$ may comprise a second CWDM waveband; the wavelengths of optical signals $\beta_{31}$ and $\beta_{32}$ may comprise a third CWDM waveband; and the wavelengths of optical signals $\beta_{41}$ and $\beta_{42}$ may comprise a fourth CWDM waveband. In various examples, these CWDM wavebands may be CWMD-4 wavebands. In other examples, waveband transmitter 1000 may receive optical signals of a different number of CWDM wavebands. Similarly, the CWDM wavebands may be comprised of additional wavelengths (e.g., three wavelengths per CWDM waveband, four wavelengths per CWDM waveband, etc.). In general, a waveband transmitter (e.g. waveband transmitter 1000) may receive optical signals of one or more CWDM wavebands on a common waveguide. These wavebands may be comprised of two or more wavelengths.

As described above, the first wavelengths of each CWDM waveband (i.e., the wavelengths of optical signals $\beta_{11}$, $\beta_{21}$, $\beta_{31}$, and $\beta_{41}$) may be referred to as the "odd wavelengths." The second wavelengths of each CWDM waveband (i.e., the wavelengths of optical signals $\beta_{12}$, $\beta_{22}$, $\beta_{32}$, and $\beta_{42}$) may be referred to as the "even wavelengths."

As depicted, optical signals $\beta_{11}$-$\beta_{42}$ may be received by waveband transmitter 1000 and carried to interleaver DEMUX 1010. An interleaveler DEMUX may refer to an optical device which splits multiplexed optical signals of odd and even wavelengths onto separate waveguides.

Accordingly, interleaver DEMUX 1010 may split optical signals of odd wavelengths (e.g., optical signals $\beta_{11}$, $\beta_{21}$, $\beta_{31}$, and $\beta_{41}$) onto a first waveguide and optical signals of even wavelengths (e.g., optical signals $\beta_{12}$, $\beta_{22}$, $\beta_{32}$, and $\beta_{42}$) onto a second waveguide.

The even and odd optical signals may be carried on their respective waveguides to DEMUXs 1020 and 1022 respectively. DEMUXs 1020 and 1022 may split the optical signals they receive onto separate waveguides by wavelength. In particular, DEMUX 1020 may split optical signals of odd wavelengths (e.g., optical signals $\beta_{11}$, $\beta_{21}$, $\beta_{31}$, and $\beta_{41}$) onto four separate waveguides by wavelength. For example, DEMUX 1020 may split optical signal $\beta_{11}$ onto a first waveguide; optical signal $\beta_{21}$ onto a second waveguide; optical signal $\beta_{31}$ onto a third waveguide; and optical signal $\beta_{41}$ onto a fourth waveguide. DEMUX 1022 may split optical signals of even wavelengths (e.g., optical signals optical signals $\beta_{12}$, $\beta_{22}$, $\beta_{32}$, and $\beta_{42}$) in the same/similar manner. In various embodiments, DEMUXs 1020 and 1022 may be, but not limited to, lattice filter, microring, array waveguide grating, and echelle grating DEMUXs which can be constructed/sourced from readily available silicon photonic foundry process design kits.

Once on its own respective waveguide, an optical signal of a given wavelength may be carried to an optical modulator calibrated to modulate optical signals of the given wavelength. For example, optical signal $\beta_{11}$ may be carried to optical modulator 1031, which may be calibrated to modulate optical signals of optical signals $\beta_{11}$'s wavelength. The other optical signals may be modulated in the same/similar fashion.

As described above, optical modulators 1030-1037 may be various types of optical modulators. For example, if optical signals $\beta_{11}$-$\beta_{42}$ comprise CWDM-4 wavebands, optical modulators 1030-1037 may be readily available optical modulators used with existing CWDM-4 technologies. In some examples, optical modulators 1030-1037 may be microring modulators. In other examples, they may be Mach Zehnder modulators.

The odd modulated optical signals (which may be represented as $\beta'_{11}$, $\beta'_{21}$, $\beta'_{31}$, and $\beta'_{41}$) may be carried to MUX 1040, and the even modulated optical signals (which may be represented as $\beta'_{12}$, $\beta'_{22}$, $\beta'_{32}$, and $\beta'_{42}$) may be carried to MUX 1042. In the same/similar manner as described in the previous figures, MUX 1040 may combine the odd modulated optical signals onto one waveguide and MUX 1042 may combine the even modulated optical signals onto another waveguide. These two waveguides may carry the modulated optical signals to interleaver MUX 1050.

An interleaver MUX may refer to an optical device which combines optical signals of odd wavelengths with optical signals of even wavelengths onto a common waveguide. Accordingly, interleaver MUX 1050 may combine modulated optical signals of odd wavelengths (e.g., optical signals $\beta'_{11}$, $\beta'_{21}$, $\beta'_{31}$, and $\beta'_{41}$) with modulated optical signals of even wavelengths (e.g., optical signals $\beta'_{12}$, $\beta'_{22}$, $\beta'_{32}$, and $\beta'_{42}$) onto a common output waveguide. As will be described below, these modulated optical signals may be carried to a waveband receiver, which operates to detect the modulated optical signals. This may correspond to "reading/extracting" the data imparted onto the modulated optical signals.

Similar to waveband transmitter 800 and 900, waveband transmitter 1000 may also operate with existing CWDM/CWDM-4 technologies. For example, waveband transmitter 1000 may be combined with existing CWDM-4 technologies by tuning either the odd optical modulators (i.e., optical modulators 1031, 1033, 1035, 1037) or the even optical modulators (i.e., optical modulators 1030, 1032, 1034, 1036) to modulate optical signals of the CWDM-4 wavelengths. Similarly, the DEMUXs and MUXs of waveband transmitter 1000 may be calibrated to split or combine optical signals of the CWDM-4 wavelengths. Accordingly, waveband transmitter 1000 may operate with existing CWDM-4 technologies, as well as scaled-up technologies which utilize the CWDM wavebands of the present disclosure.

Figure 11:
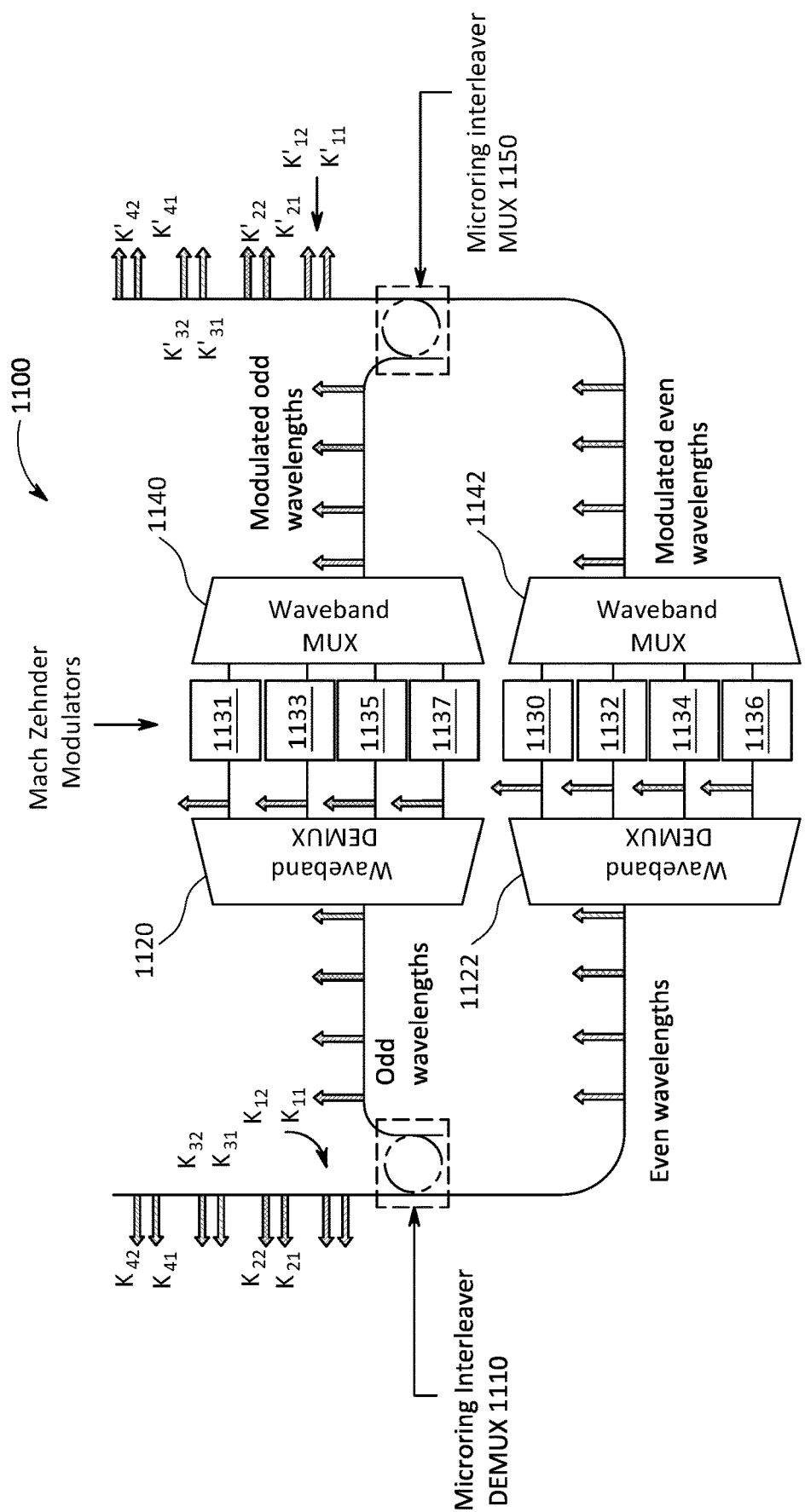
FIG. 11 depicts another example waveband transmitter, in accordance with various examples of the presently disclosed technology.

FIG. 11 depicts another example waveband transmitter, in accordance with various examples of the presently disclosed technology. Waveband transmitter 1100 includes one microring interleaver DEMUX, two additional DEMUXs after the microring interleaver DEMUX, eight Mach Zehnder modulators, two MUXs, one microring interleaver MUX, and various waveguides which connect the aforementioned optical components.

Similar to waveband transmitters 800-1000, waveband transmitter 1100 may receive eight optical signals of eight different wavelengths on a single input waveguide (i.e., optical signals $\kappa_{11}$, $\kappa_{12}$, $\kappa_{21}$, $\kappa_{22}$, $\kappa_{31}$, $\kappa_{32}$, $\kappa_{41}$, $\kappa_{42}$). These eight different wavelengths may comprise four CWDM wavebands, of two wavelengths each. For example, the wavelengths of optical signals Kul and $\kappa_{12}$ may comprise a first CWDM waveband; the wavelengths of optical signals $\kappa_{21}$ and $\kappa_{22}$ may comprise a second CWDM waveband; the wavelengths of optical signals $\kappa_{31}$ and $\kappa_{32}$ may comprise a third CWDM waveband; and the wavelengths of optical signals $\kappa_{41}$ and $\kappa_{42}$ may comprise a fourth CWDM waveband. In various examples, these CWDM wavebands may be CWDM-4 wavebands. In other examples, waveband transmitter 1100 may receive optical signals of a different number of CWDM wavebands. Similarly, the CWDM wavebands may be comprised of additional wavelengths (e.g., three wavelengths per CWDM waveband, four wavelengths per CWDM waveband, etc.). In general, a waveband transmitter (e.g., waveband transmitter 1100) may receive optical signals of one or more CWDM wavebands on a common waveguide. These wavebands may be comprised of two or more wavelengths.

As described above, the first wavelengths of each CWDM waveband (i.e., the wavelengths of optical signals $\kappa_{11}$, $\kappa_{21}$, $\kappa_{31}$, and $\kappa_{41}$) may be referred to as the "odd wavelengths." The second wavelengths of each CWDM waveband (i.e., the wavelengths of optical signals $\kappa_{12}$, $\kappa_{22}$, $\kappa_{32}$, and $\kappa_{42}$) may be referred to as the "even wavelengths."

As depicted, optical signals $\kappa_{11}$-$\kappa_{42}$ may be received by waveband transmitter 1100 and carried to microring interleaver DEMUX 1110. An interleaver DEMUX may refer to an optical device which splits multiplexed optical signals of odd wavelengths and even wavelengths onto separate waveguides. Microring interleaver DEMUX 1110 may act as a drop filter for optical signals of certain wavelengths. In particular, microring interleaver DEMUX 1110 may be tuned to "drop" odd optical signals (e.g., optical signals $\kappa_{11}$, $\kappa_{21}$, $\kappa_{31}$, $\kappa_{41}$) onto the waveguide which carries the odd optical signals to DEMUX 1120, while allowing even optical signals (e.g. optical signals $\kappa_{12}$, $\kappa_{22}$, $\kappa_{32}$, $\kappa_{42}$) to pass undisturbed. In this way, microring interleaver DEMUX 1110 may split odd and even optical signals (e.g., optical signals $\kappa_{11}$-$\kappa_{42}$) onto separate waveguides.

In certain examples, microring interleaver DEMUX 1110 may have a periodic Free Spectrum Range (FSR). This FSR may allow microring interleaver DEMUX 1110 to "drop" optical signals of wavelengths spaced a certain spacing apart. For example, the FSR of microring interleaver DEMUX may be tuned to "drop" optical signals of odd wavelengths equivalent to the wavelengths of optical signals $\kappa_{11}, \kappa_{21}, \kappa_{31}, \kappa_{41}$. In certain embodiments, these odd wavelengths may be spaced approximately 20 nm apart.

The even and odd optical signals may be carried on their respective waveguides to DEMUXs 1120 and 1122 respectively. DEMUXs 1120 and 1122 may split the optical signals they receive onto separate waveguides by wavelength. In particular, DEMUX 1120 may split optical signals of odd wavelengths (e.g., optical signals $\kappa_{11}, \kappa_{21}, \kappa_{31}, \kappa_{41}$) onto four separate waveguides by wavelength. For example, DEMUX 1120 may split optical signal $\kappa_{11}$ onto a first waveguide; optical signal $\kappa_{21}$ onto a second waveguide; optical signal $\kappa_{31}$ onto a third waveguide; and optical signal $\kappa_{41}$ onto a fourth waveguide. DEMUX 1122 may split optical signals of even wavelengths (e.g., optical signals optical signals $\kappa_{12}, \kappa_{22}, \kappa_{32}, \kappa_{42}$) in the same/similar manner. In various embodiments, DEMUXs 1120 and 1122 may be, but not limited to, lattice filter, microrings, arrayed waveguide gratings and echelle gratings DEMUXs which can be designed/constructed/sourced from readily available silicon photonic foundry process design kits.

Once on its own respective waveguide, an optical signal of a given wavelength may be carried to a Mach Zehnder modulator calibrated to modulate optical signals of the given wavelength. For example, optical signal $\kappa_{11}$ may be carried to optical modulator 1131, which may be calibrated to modulate optical signals of optical signals $\kappa_{11}$'s wavelength. The other optical signals may be modulated in the same/similar fashion.

The odd modulated optical signals (which may be represented as $\kappa'_{11}, \kappa'_{21}, \kappa'_{31}, \kappa'_{41}$) may be carried to MUX 1140, and the even modulated optical signals (which may be represented as $\kappa'_{12}, \kappa'_{22}, \kappa'_{32}, \kappa'_{42}$) may be carried to MUX 1142. In the same/similar manner as described in the previous figures, MUX 1140 may combine the odd modulated optical signals onto one waveguide and MUX 1142 may combine the even modulated optical signals onto another waveguide. These two waveguides may carry the modulated optical signals to microring interleaver MUX 1150.

A microring interleaver MUX may be an optical device which combines optical signals of odd and even wavelengths onto a common fiber/waveguide. Microring interleaver MUX 1150 may act as a drop filter for optical signals of certain wavelengths. In particular, microring interleaver MUX 1150 may be tuned to "drop" odd modulated optical signals (e.g., optical signals $\kappa'_{11}, \kappa'_{21}, \kappa'_{31}, \kappa'_{41}$) onto the waveguide which carries even modulated optical signals—while allowing even optical signals (e.g., optical signals $\kappa'_{12}, \kappa'_{22}, \kappa'_{32}, \kappa'_{42}$) to pass undisturbed. In this way, microring interleaver MUX 1150 may combine odd and even modulated optical signals (e.g., optical signals $\kappa'_{11}$-$\kappa'_{42}$) onto a single output waveguide. As will be described below, these modulated optical signals may be carried to a waveband receiver, which operates to detect the modulated optical signals. This may correspond to "reading/extracting" the data imparted onto the modulated optical signals.

In certain examples, microring interleaver MUX 1150 may have a periodic Free Spectrum Range (FSR). This FSR may allow microring interleaver MUX 1150 to "drop" optical signals of wavelengths spaced a certain spacing apart. For example, the FSR of microring interleaver DEMUX may be tuned to "drop" optical signals of odd wavelengths equivalent to the wavelengths of modulated optical signals $\kappa'_{11}, \kappa'_{21}, \kappa'_{31}, \kappa'_{41}$. In certain embodiments, these odd wavelengths may be spaced approximately 20 nm apart.

Similar to waveband transmitters 800-1000, waveband transmitter 1100 may also operate with existing CWDM/CWDM-4 technologies. For example, waveband transmitter 1100 may be combined with existing CWDM-4 technologies by tuning either the odd optical modulators (i.e., optical modulators 1131, 1133, 1135, 1137) or the even optical modulators (i.e., optical modulators 1130, 1132, 1134, 1136) to modulate optical signals of the CWDM-4 wavelengths. Similarly, the DEMUXs and MUXs of waveband transmitter 1100 may be calibrated to split or combine optical signals of the CWDM-4 wavelengths. Accordingly, waveband transmitter 1100 may operate with existing CWDM-4 technologies, as well as scaled-up technologies which utilize the CWDM wavebands of the present disclosure.

Figure 12:
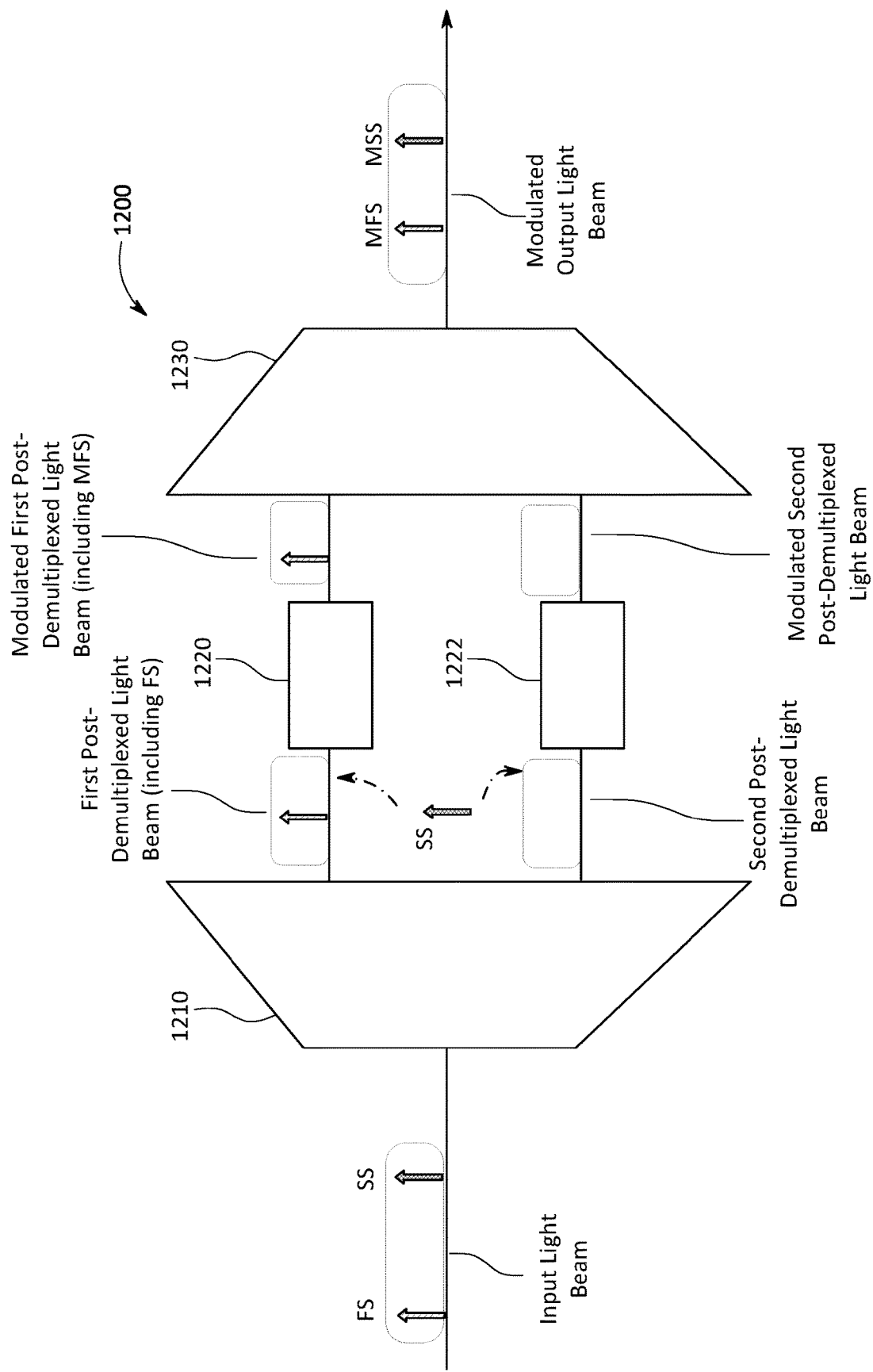
FIG. 12 depicts another example waveband transmitter, in accordance with various examples of the presently disclosed technology.

FIG. 12 depicts another example waveband transmitter, in accordance with various examples of the presently disclosed technology. Waveband transmitter 1200 may be viewed as a generic waveband transmitter from which waveband transmitters 800-1100 may be derived.

Waveband transmitter 1200 may comprise: a combination of one or more optical demultiplexers 1210; at least a first optical modulator 1220 and a second optical modulator 1222; and a combination of one or more optical multiplexers 1230. These components may be connected by various waveguides.

The combination of one or more optical multiplexers 1210 may split an input light beam into at least a first post-demultiplexed light beam and a second post-demultiplexed light beam.

The input light beam may comprise at least a first optical signal (FS) and a second optical signal (SS). FS may be a first wavelength of a first CWDM waveband, and SS may be a second wavelength of the first CWDM waveband. The first CWDM waveband may comprise at least the first and second wavelength within a first CWDM passband. The first CWDM passband may comprise a spectrum of wavelengths that includes a first CWDM wavelength, which can pass through an optical filter. In various examples, the input light beam may comprise optical signals of additional CWDM wavebands (e.g., optical signals of a second CWDM waveband, optical signals of a third CWDM waveband, etc.), or optical signals of additional wavelengths within first CWDM passband/waveband (e.g., an optical signal of a third wavelength within the first CWDM passband, an optical signal of a fourth wavelength within the first CWDM passband, etc.).

A post-demultiplexed light beam may refer to a light beam which has been split by one or more optical demultiplexers (this may include a light beam which was initially split by an optical demultiplexer, and then combined with another light beam by an optical multiplexer).

The first post-demultiplexed light beam may comprise at least FS. In various examples, the first post-demultiplexed light beam may comprise optical signals of additional wavelengths. For example, in waveband transmitter 900, the first post-demultiplexed light beam would comprise FS and SS (whose wavelengths comprise the first and second wavelengths of the first CWDM waveband respectively). Similarly, in waveband transmitter 900, the second post-demultiplexed light beam would comprise a third optical signal and a fourth optical signal, wherein the third optical signal and the fourth optical signal are a first and second wavelength of a second CWDM waveband, respectively.

The second post-demultiplexed light beam may comprise at least one optical signal which is a different wavelength than FS. In certain examples, e.g., waveband transmitters 800, 1000, and 1100, the second post-demultiplexed light beam may comprise SS. In other examples, e.g., waveband transmitter 900, SS may instead be a part of the first post-demultiplexed light beam. Accordingly, the at least one optical signal which is a different wavelength than FS may be e.g., a third optical signal, a fourth optical signal, etc. Here, the third optical signal may be a first wavelength of a second CWDM waveband, the fourth optical signal may be a second wavelength of the second CWDM waveband, etc.

The combination of one or more optical multiplexers 1210 may split the input light beam into additional post-demultiplexed light beams. For example the combination of one or more optical multiplexers 1210 may split the input light beam into the first post-demultiplexed light beam, the second post-demultiplexed light beam, a third post-demultiplexed light beam, etc. In certain embodiments, each of these post-demultiplexed light beam may comprise optical signals of a separate CWDM waveband. For example, the first post-demultiplexed light beam may comprise optical signals of a first CWDM waveband, the second post-demultiplexed light beam may comprise optical signals of a second CWDM waveband, the third post-demultiplexed light beam may comprise optical signals of a third CWDM waveband, etc.

The combination of one or more one or more optical demultiplexers 1210 may comprise any number of, and any type of, optical demultiplexers.

For example, in accordance with waveband transmitter 800, the combination of one or more optical demultiplexers 1210 may comprise a waveband demultiplexer, and multiple wavelength demultiplexers. As used herein, a waveband demultiplexer may refer to an optical demultiplexer which splits an input light beam by waveband. For example, a waveband demultiplexer may split an input light beam comprised of optical signals of multiple wavebands, into separate light beams comprised of optical signals of the individual wavebands. In some examples, a wavelength demultiplexer may refer to an optical demultiplexer which splits a light beam by wavelength. For example, a wavelength demultiplexer may split a light beam comprised of optical signals of multiple wavelengths, into separate lights beams comprised of optical signals of a single wavelength. The waveband and wavelength demultiplexers may be, but not limited to, lattice filter, microring, arrayed waveguide grating, or echelle grating demultiplexers which can be designed/constructed/sourced from readily available silicon photonic foundry process design kits.

In another example, in accordance with waveband transmitter 900, the combination of one or more optical demultiplexers 1210 may comprise a single waveband demultiplexer (which may also be designed/constructed/sourced from readily available silicon photonic foundry process design kits).

In certain examples (e.g., waveband transmitter 1000 and 1100 respectively), the combination of one or more optical demultiplexers 1210 may also comprise interleaver demultiplexers (which may split an input light beam into a first light beam comprised of optical signals of odd wavelengths, and a second light beam comprised of optical signals of even wavelengths) and microring interleaver demultiplexers. As described above, a microring interleaver demultiplexer may be a specific type of interleaver demultiplexer which acts as a "drop" filter for optical signals of odd wavelengths or optical signals of even wavelengths, which are spaced a periodic distance apart on the electromagnetic spectrum.

A first optical modulator (i.e., optical modulator 1220) may modulate the first post-demultiplexed light beam by modulating FS. As described above, an optical modulator may be an optical device which imparts data onto an optical signal by modulating the optical signal. An optical modulator may be calibrated to modulate optical signals of a certain wavelength. For example, optical modulator 1220 may be calibrated to modulate optical signals of FS's wavelength (i.e., the first wavelength of the first CWDM waveband).

Optical modulator 1220 may be any type of optical modulator. For example, if FS is a first CWDM-4 wavelength, optical modulator 1220 may be a readily available optical modulator used with existing CWDM-4 technologies. In some examples, optical modulator 1220 may be a microring modulator which is tuned to modulate optical signals of FS's wavelength. In other examples, optical modulator 1220 may be a Mach Zehnder modulator.

A second optical modulator (i.e., optical modulator 1222) may modulate the second post-demultiplexed light beam by modulating the at least one optical signal which is a different wavelength than FS. Like optical modulator 1220, optical modulator 1222 may be any type of optical modulator. Accordingly, optical modulator 1222 may be calibrated/tuned to modulate optical signals of the wavelength of the at least one optical signal which is a different wavelength than FS. For example, if the at least one optical signal which is a different wavelength than FS is SS, optical modulator 1222 may be calibrated/tuned to modulate optical signals of the second wavelength of the first CWDM waveband. By contrast, if the at least one optical signal which is a different wavelength than FS is a third optical signal—which is a first wavelength of a second CWDM waveband—optical modulator 1222 may be calibrated/tuned to modulate optical signals of the first wavelength of the second CWDM waveband.

In certain examples, waveband transmitter 1200 may be comprised of additional optical modulators. Accordingly, each optical modulator may be calibrated/tuned to modulate optical signals of a different wavelength within various CWDM passbands.

A combination of one or more optical multiplexers 1230 may combine, into a modulated output light beam, the modulated first post-demultiplexed light beam and the modulated second post-demultiplexed light beam.

The combination of one or more optical multiplexers 1230 may comprise any number of, and any type of, optical multiplexers.

For example, in accordance with waveband transmitter 800, the combination of one or more optical multiplexers 1230 may comprise multiple wavelength multiplexers and a waveband multiplexer. A wavelength multiplexer may refer to an optical multiplexer which combines wavelengths. For example, a wavelength multiplexer may combine a first light beam comprised of a first optical signal of a first wavelength with a second light beam comprised of a second optical signal of a second wavelength into a common light beam. As used herein, a waveband multiplexer may refer to an optical multiplexer which combines wavebands. Said differently, a waveband multiplexer may combine a first light beam comprised of optical signals of a first CWDM waveband with a second light beam comprised of optical signals of a second CWDM waveband into a common light beam. The wavelength and waveband multiplexers may be, but not limited to, lattice filter, microring, arrayed waveguide grating, and echelle grating multiplexers which can be designed/constructed/sourced from readily available silicon photonic foundry process design kits.

In another example, in accordance with waveband transmitter 900, the combination of one or more optical multiplexers 1230 may comprise a single waveband multiplexer (which may also be designed/constructed/sourced from readily available silicon photonic foundry process design kits).

In certain examples (e.g., waveband transmitter 1000 and 1100 respectively), the combination of one or more optical multiplexers 1230 may also comprise interleaver multiplexers (which may combine a first light beam comprised of optical signals of odd wavelengths with a second light beam comprised of optical signals of even wavelengths, into a common light beam) and microring interleaver multiplexers (which may be a specific type of interleaver multiplexer which acts as a "drop" filter for either optical signals of odd wavelengths or optical signals of even wavelengths—of a periodic spacing apart).

Similar to waveband transmitters 800-1100, waveband transmitter 1200 may also operate with existing CWDM/CWDM-4 technologies. For example, waveband transmitter 1200 may be combined with existing CWDM-4 technologies by tuning at least the first optical modulator 1220 to modulate optical signals of a first CWDM-4 wavelength. Similarly, the combination of one or more demultiplexers 1210, and the combination of one or more multiplexers 1230, may be calibrated to split or combine optical signals of the CWDM-4 wavelengths. Accordingly, waveband transmitter 1200 may operate with existing CWDM-4 technologies, as well as scaled-up technologies which utilize the CWDM wavebands of the present disclosure.

Figure 13:
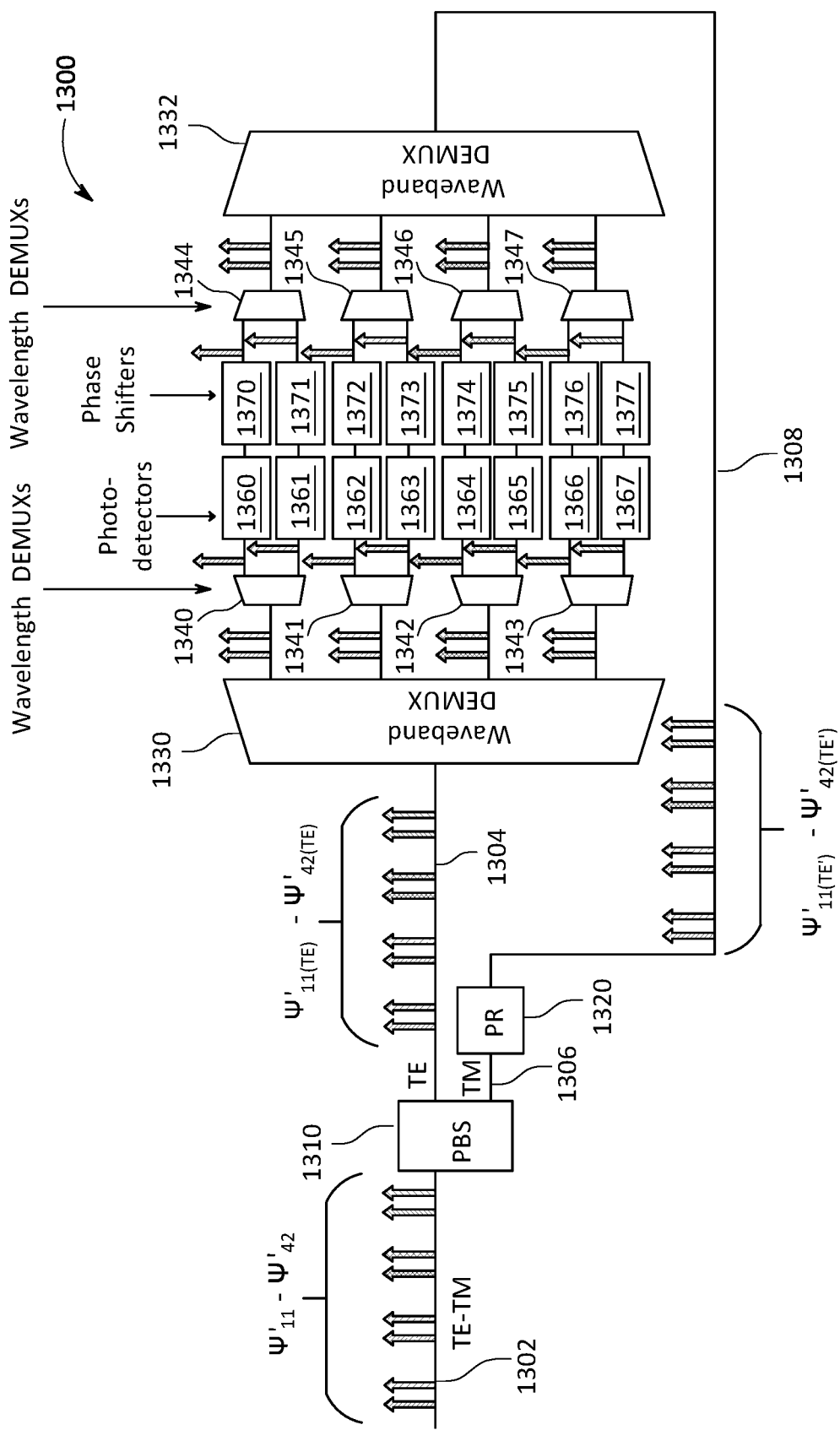
FIG. 13 depicts an example waveband receiver, in accordance with various examples of the presently disclosed technology.

FIG. 13 depicts an example waveband receiver, in accordance with various examples of the presently disclosed technology. Waveband receiver 1300 may be comprised of a polarization beam splitter, a polarization rotator, two waveband demultiplexers, eight wavelength demultiplexers, eight phase shifters, eight waveguide photodetectors, and various waveguides which connect the aforementioned components.

In general, a waveband receiver may detect modulated optical signals of one or more CWDM wavebands received from a common waveguide. These wavebands may be comprised of two or more wavelengths. As described above, by detecting modulated optical signals, a waveband receiver may read/extract the data imparted onto the modulated optical signals. Here, waveband receiver 1300 may receive eight modulated optical signals of eight different wavelengths on a single input waveguide (i.e., optical signals $\psi'_{11}$, $\psi'_{12}$, $\psi'_{21}$, $\psi'_{22}$, $\psi'_{31}$, $\psi'_{32}$, $\psi'_{41}$, $\psi'_{42}$). These eight different wavelengths may comprise four CWDM wavebands of two wavelengths each. For example, the wavelengths of optical signals $\psi'_{12}$ and $\psi'_{21}$ may comprise a first CWDM waveband; the wavelengths of optical signals $\psi'_{21}$ and $\psi'_{22}$ may comprise a second CWDM waveband; the wavelengths of optical signals $\psi'_{31}$ and $\psi'_{32}$ may comprise a third CWDM waveband; and the wavelengths of optical signals $\psi'_{41}$ and $\psi'_{42}$ may comprise a fourth CWDM waveband. In various examples, these CWDM wavebands may be CWMD-4 wavebands. In other examples, waveband receiver 1300 may receive modulated optical signals of a different number of CWDM wavebands (e.g., optical signals of two wavebands, three wavebands, five wavebands, etc.). Similarly, the CWDM wavebands may be comprised of additional wavelengths (e.g., three wavelengths per CWDM waveband, four wavelengths per CWDM waveband, etc.).

In the specific example of FIG. 13, waveband receiver 1300 receives optical signals of four CWDM wavebands, where each CWDM waveband is comprised of two wavelengths. Said differently, waveband receiver 1300 may receive eight optical signals on a single input waveguide. Accordingly, waveband receiver 1300 may operate with any of the waveband light sources and waveband transmitters described in conjunction with FIGS. 2-12. As a reminder from above, each of these waveband light sources can produce optical signals of eight different wavelengths (comprising four CWDM wavebands of two wavelengths each), and each of the waveband transmitters can modulate optical signals of these eight wavelengths.

In various examples, waveband receiver 1300 may implement a polarization diversity scheme.

Polarization is a property of transverse waves (such as electromagnetic waves) that specifies the geometrical orientation of oscillations. In a transverse wave, the direction of oscillation is perpendicular to the direction of motion of the wave. An electromagnetic wave such as light consists of a coupled oscillating electric field and an oscillating magnetic field which are always perpendicular to each other. In general, when light travels in an optical fiber/waveguide, the polarization of the light is allowed to rotate. Thus, by the time waveband receiver 1300 receives modulated optical signals $\psi'_{11}$-$\psi'_{42}$, the modulated optical signals will typically have an unknown polarization. Said differently, the orientation of the oscillating electric and magnetic fields of these optical signals may be unknown.

In general, the response of optical receivers is polarization dependent. In other words, an optical receiver may have a higher response to one polarization over another. Also, optical waveguides are typically polarization dependent, and photonic integrated circuits are easier to design for a single polarization. Accordingly, many photonic integrated circuits, especially those found in silicon foundry PDKs, are polarization dependent, and the optical elements built from these waveguides are optimized for a single polarization. In most cases, they are optimized for the TE mode.

Accordingly, waveguide 1302 may have polarization dependence. Said differently, waveguide 1302 may have two modes. The first mode may be a transverse-electric (TE) mode. The oscillating electromagnetic fields of modulated optical signals $\psi'_{11}$-$\psi'_{42}$ may partially excite the TE mode. This TE mode may have a known polarization state (e.g., a "horizontal" polarization state). The second mode may be a transverse-magnetic (TM) mode. The oscillating electromagnetic fields of modulated optical signals $\psi'_{11}$-$\psi'_{42}$ may partially excite the this TM mode. This TM mode may have a known polarization state (e.g., a "vertical" polarization state). As part of waveband receiver 1300's polarization diversity scheme, these two modes may be split spatially onto two separate waveguides.

Accordingly, waveguide 1302 may carry modulated optical signals $\psi'_{11}$-$\psi'_{42}$ to polarization beam splitter 1310. A polarization beam splitter may refer to an optical device which spatially splits a light beam (such as the light beam comprised of modulated optical signals $\psi'_{11}$-$\psi'_{42}$) into two physically separated light beams which have known polarization states which are orthogonal to each other. Accordingly, polarization beam splitter 1310 may split the light beam comprising modulated optical signals $\psi'_{11}$-$\psi'_{42}$ into two separate light beams. The first light beam may comprise the TE mode of the input light beam (i.e., the "horizontal" polarization state), and may continue to propagate along waveguide 1304 (which may only have the single TE mode). The second light beam may comprise the TM mode of the input light beam (i.e., the "vertical" polarization state), and may continue to propagate along waveguide 1306 (which may only have the single TM mode). The modulated optical signals of this first light beam may be represented as modulated optical signals $\psi'_{11(TE)}$-$\psi'_{42(TE)}$. The modulated optical signals of the second light beam may be represented as optical signals $\psi'_{11(TM)}$-$\psi'_{42(TM)}$ (not depicted).

In certain examples, waveguide 1306 may carry modulated optical signals $\psi'_{11(TM)}$-$\psi'_{42(TM)}$ to polarization rotator 1320. A polarization rotator may refer to an optical device which rotates the polarization state of a light beam. Accordingly, polarization rotator 1320 may rotate the polarization state of modulated optical signals $\psi'_{11(TM)}$-$\psi'_{42(TM)}$ 90 degrees so that they propagate in the TE mode as well. The rotated modulated optical signals may be represented as $\psi'_{11(TE')}$-$\psi'_{42(TE')}$, and may propagate along waveguide 1308 in the TE mode.

After polarization beam splitting (and in certain examples, polarization rotation), the modulated optical signals of known polarization may be carried to waveband demultiplexers. In particular, waveguide 1304 may carry modulated optical signals $\psi'_{11(TE)}$-$\psi'_{42(TE)}$ to waveband demultiplexer 1330, and waveguide 1308 may carry modulated optical signals $\psi'_{11(TE')}$-$\psi'_{42(TE')}$ to waveband demultiplexer 1332.

Waveband demultiplexers 1330 and 1332 may be the same/similar as the waveband demultiplexers described in conjunction with previous figures. Accordingly, waveband demultiplexer 1330 may split modulated optical signals $\psi'_{11(TE)}$-$\psi'_{42(TE)}$ by waveband (i.e., modulated optical signals $\psi'_{11(TE)}$ and $\psi'_{42(TE)}$ may be split onto a first waveguide; modulated optical signals $\psi'_{21(TE)}$ and $\psi'_{22(TE)}$ may be split onto a second waveguide, etc.). In the same/similar fashion waveband demultiplexer 1332 may split modulated optical signals $\psi'_{11(TE')}$-$\psi'_{42(TE')}$ by waveband (i.e., modulated optical signals $\psi'_{11(TE')}$ and $\psi'_{12(TE')}$ may be split onto a first waveguide; modulated optical signals $\psi'_{21(TE')}$ and $\psi'_{22(TE')}$ may be split onto a second waveguide, etc.).

After the modulated optical signals have been split by waveband, the modulated optical signals may be carried to wavelength demultiplexers 1340-1347. These wavelength demultiplexers may be the same/similar as the wavelength demultiplexers described in conjunction with previous figures. Accordingly, the wavelength demultiplexers may split the modulated optical signals by wavelength. For example: wavelength demultiplexer 1340 may split modulated optical signals $\psi'_{11(TE)}$ and $\psi'_{12(TE)}$ onto two separate waveguides; wavelength demultiplexer 1341 may split modulated optical signals $\psi'_{21(TE)}$ and $\psi'_{22(TE)}$ onto two separate waveguides; etc. In the same/similar fashion, wavelength demultiplexer 1344 may split modulated optical signals $\psi'_{11(TE')}$ and $\psi'_{12(TE')}$ onto two separate waveguides; wavelength demultiplexer 1345 may split modulated optical signals $\psi'_{21(TE')}$ and $\psi'_{22(TE')}$ onto two separate waveguides; etc.

Once modulated optical signals $\psi'_{11(TE)}$-$\psi'_{42(TE)}$ (i.e. the optical signals which were transmitted along waveguide 1304) have been split onto their own separate waveguides, they may be carried to waveguide photodetectors 1360-1367. A waveguide photodetector may refer to an optical device which can detect a modulated optical signal when implemented on a waveguide. In certain examples, the waveguide photodetectors may be calibrated to detect modulated optical signals of a certain wavelength. For example, waveguide photodetector 1360 may be calibrated to detect modulated optical signals of modulated optical signal $\psi'_{11(TE)}$'s wavelength (i.e., the first wavelength of the first CWDM waveband). In the same/similar fashion: waveguide photodetector 1361 may be calibrated to detect modulated optical signals of modulated optical signal $\psi'_{12(TE)}$'s wavelength (i.e., the second wavelength of the first CWDM waveband); waveguide photodetector 1362 may be calibrated to detect modulated optical signals of modulated optical signal $\psi'_{21(TE)}$'s wavelength (i.e., the first wavelength of the second CWDM waveband); waveguide photodetector 1363 may be calibrated to detect modulated optical signals of modulated optical signal $\psi'_{22(TE)}$'s wavelength (i.e., the second wavelength of the second CWDM waveband); etc.

In the same/similar fashion, modulated optical signals $\psi'_{11(TE')}$-$\psi'_{42(TE')}$ (i.e., the optical signals which were transmitted along waveguide 1308) may be carried to, and detected by, waveguide photodetectors 1360-1367. For example, waveguide photodetector 1360 may be calibrated to detect modulated optical signals of modulated optical signal $\psi'_{21(TE')}$'s wavelength (i.e., the first wavelength of the first CWDM waveband). In the same/similar fashion: waveguide photodetector 1361 may be calibrated to detect modulated optical signals of modulated optical signal $\psi'_{12(TE')}$'s wavelength (i.e., the second wavelength of the first CWDM waveband); waveguide photodetector 1362 may be calibrated to detect modulated optical signals of modulated optical signal $\psi'_{21(TE)}$'s wavelength (i.e., the first wavelength of the second CWDM waveband); waveguide photodetector 1363 may be calibrated to detect modulated optical signals of modulated optical signal $\psi'_{22(TE')}$'s wavelength (i.e., the second wavelength of the second CWDM waveband); etc.

Accordingly, waveguide photodetectors 1360-1367 may detect modulated optical signals $\psi'_{11(TE)}$-$\psi'_{42(TE)}$ and $\psi'_{11(TE')}$-$\psi'_{42(TE')}$, which may correspond to reading/extracting the data imparted onto them.

In certain examples, prior to being detected by waveguide photodetectors 1360-1367, either (or both) of modulated optical signals $\psi'_{11(TE)}$-$\psi'_{42(TE)}$ and modulated optical signals $\psi'_{11(TE')}$-$\psi'_{42(TE')}$ may be transmitted through one of phase shifters 1370-1377. A phase shifter may refer to an optical device which shifts the phase of an optical signal. Accordingly, waveband receiver 1300 may include phase shifters in order to account for any polarization modal dispersion in optical fibers and time delays caused by the modulated optical signals taking different paths to the waveguide photodetectors (e.g., waveguide 1308 may be longer than waveguide 1304). For example, prior to being carried to waveguide photodetector 1360, modulated optical signals $\psi'_{11(TE')}$ may be transmitted through phase shifter 1370 in order to ensure that modulated optical signal $\psi'_{11(TE')}$ is the same phase as modulated optical signal $\psi'_{11(TE)}$ when the two modulated optical signals are detected by waveguide photodetector 1360. Here, it can be desirable that the modulated optical signals are of the same phase and arrive at the same time when they are detected to ensure the waveguide photodetectors receive the same data stream from the left and right.

Similar to waveband transmitters 800-1200, waveband receiver 1300 may also operate with existing CWDM/CWDM-4 technologies. For example, waveband receiver 1300 may be combined with existing CWDM-4 technologies by calibrating/tuning: waveguide photodetector 1360 to detect modulated optical signals of a first CWDM-4 wavelength; waveguide photodetector 1362 to detect modulated optical signals of a second CWDM-4 wavelength; waveguide photodetector 1364 to detect modulated optical signals of a third CWDM-4 wavelength; and waveguide photodetector 1366 to detect modulated optical signals of a fourth CWDM-4 wavelength. Similarly, the other optical components of waveband receiver 1300 may be calibrated/tuned to operate with these CWDM-4 wavelengths. Accordingly, waveband receiver 1300 may operate with existing CWDM-4 technologies, as well as scaled-up technologies which utilize the CWDM wavebands of the present disclosure.

Similar to the previously described waveband devices, waveband receiver 1300 may be constructed using many readily available building blocks found in silicon photonic and III-V foundry process design kits (e.g., wideband fiber to chip couplers, CWDM-4 waveguide photodetectors, etc.).

Figure 14:
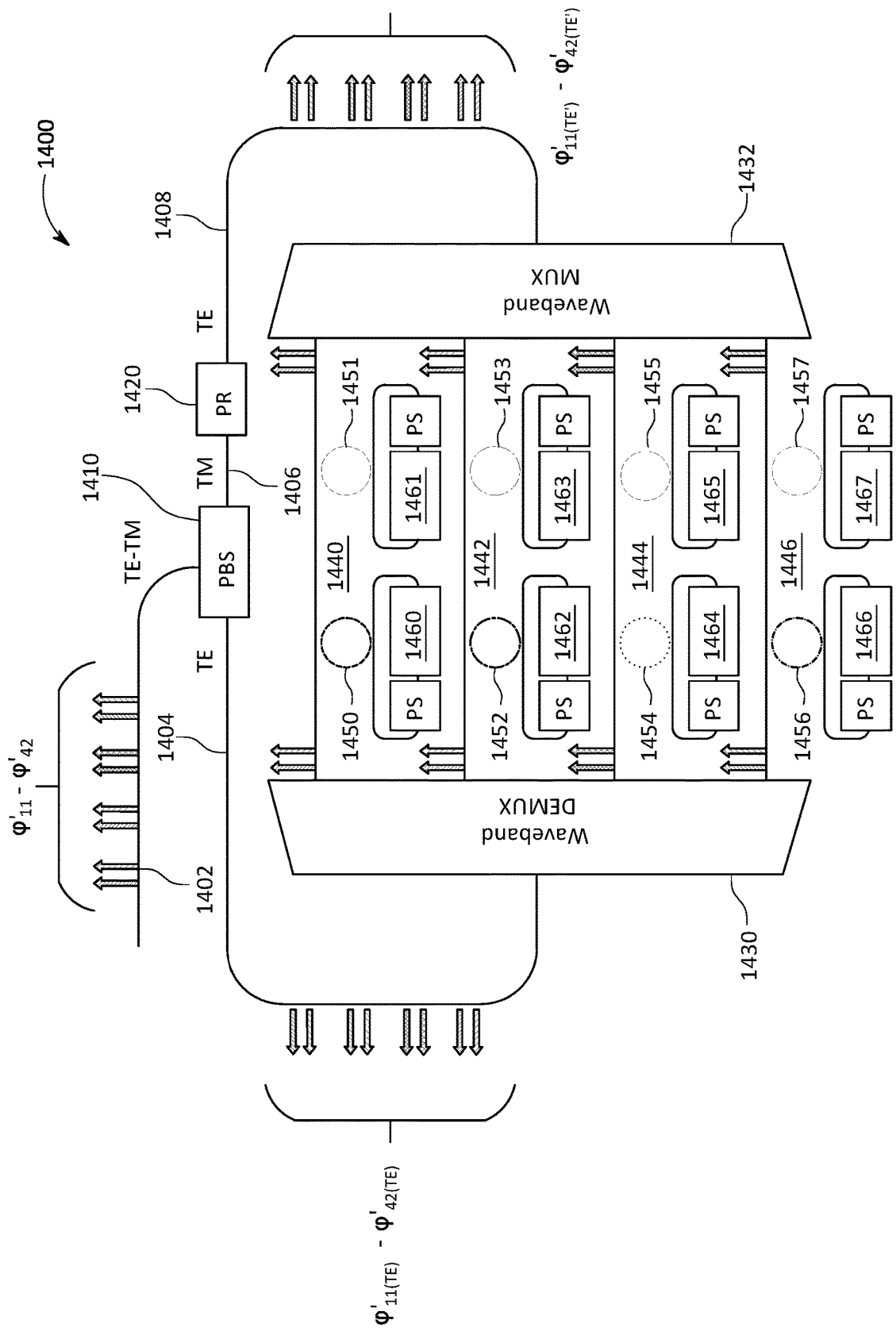
FIG. 14 depicts another example waveband receiver, in accordance with various examples of the presently disclosed technology.

FIG. 14 depicts another example waveband receiver, in accordance with various examples of the presently disclosed technology. Waveband receiver 1400 may be comprised of a polarization beam splitter, a polarization rotator, two waveband demultiplexers, eight microring resonators/drop filters, various phase shifters, eight waveguide photodetectors, and various waveguides which connect the aforementioned components.

Like waveband receiver 1300, waveband receiver 1400 may detect modulated optical signals of one or more CWDM wavebands received from a common waveguide. These wavebands may be comprised of two or more wavelengths. As described above, by detecting modulated optical signals, a waveband receiver may read/extract the data imparted onto the modulated optical signals.

Here, waveband receiver 1400 may receive eight modulated optical signals of eight different wavelengths on a single input waveguide (i.e., modulated optical signals $\varphi'_{11}$, $\varphi'_{12}$, $\varphi'_{21}$, $\varphi'_{22}$, $\varphi'_{31}$, $\varphi'_{32}$, $\varphi'_{41}$, $\varphi'_{42}$). These eight different wavelengths may comprise four CWDM wavebands of two wavelengths each. For example, the wavelengths of optical signals $\varphi'_{11}$ and $\varphi'_{12}$ may comprise a first CWDM waveband; the wavelengths of optical signals $\varphi'_{21}$ and $\varphi'_{22}$ may comprise a second CWDM waveband; the wavelengths of optical signals $\varphi'_{31}$ and $\varphi'_{32}$ may comprise a third CWDM waveband; and the wavelengths of optical signals $\varphi'_{41}$ and $\varphi'_{42}$ may comprise a fourth CWDM waveband. In various examples, these CWDM wavebands may be CWMD-4 wavebands. In other examples, waveband receiver 1400 may receive modulated optical signals of a different number of CWDM wavebands (e.g., optical signals of two wavebands, three wavebands, five wavebands, etc.). Similarly, the CWDM wavebands may be comprised of additional wavelengths (e.g., three wavelengths per CWDM waveband, four wavelengths per CWDM waveband, etc.).

In the specific example of FIG. 14, waveband receiver 1400 receives modulated optical signals of four CWDM wavebands, where each CWDM waveband is comprised of two wavelengths. Said differently, waveband receiver 1400 may receive eight optical signals on a single input waveguide. Accordingly, waveband receiver 1400 may operate with any of the waveband light sources and waveband transmitters described in conjunction with FIGS. 2-12. As a reminder from above, each of these waveband light sources can produce optical signals of eight different wavelengths (comprising four CWDM wavebands of two wavelengths each), and each of the waveband transmitters can modulate optical signals of these eight wavelengths.

Like waveband receiver 1300, waveband receiver 1400 may implement a polarization diversity scheme.

Accordingly, waveguide 1402 may have polarization dependence. Said differently, waveguide 1402 may have two modes. The first mode may be a transverse-electric (TE) mode. The oscillating electric fields of modulated optical signals $\varphi'_{11}$-$\varphi'_{42}$ may partially excite the this TE mode. This TE mode may have a known polarization state (e.g., a "horizontal" polarization state). The second mode may be a transverse-magnetic (TM) mode. The oscillating magnetic fields of modulated optical signals $\varphi'_{11}$-$\varphi'_{42}$ may partially excite the this TM mode. This TM mode may have a known polarization state (e.g., a "vertical" polarization state). As part of waveband receiver 1400's polarization diversity scheme, these two modes may be split spatially onto two separate waveguides.

Accordingly, waveguide 1402 may carry modulated optical signals $\varphi'_{11}$-$\varphi'_{42}$ to polarization beam splitter 1410. Polarization beam splitter 1410 may split the light beam comprising modulated optical signals $\varphi'_{11}$-$\varphi'_{42}$ into two separate light beams. The first light beam may comprise the TE mode of the input light beam (i.e., the "horizontal" polarization state) and may continue to propagate along waveguide 1404 (which may only have the single TE mode). The second light beam may comprise the TM mode of the input light beam (i.e., the "vertical" polarization state) and may continue to propagate along waveguide 1406 (which may only have the single TM mode). The modulated optical signals of this first light beam may be represented as modulated optical signals $\varphi'_{11(TE)}$-$\varphi'_{42(TE)}$. The modulated optical signals of the second light beam may be represented as optical signals $\varphi'_{11(TM)}$-$\varphi'_{11(TM)}$ (not depicted).

In certain examples, waveguide 1406 may carry modulated optical signals $\varphi'_{11(TM)}$-$\varphi'_{42(TM)}$ to polarization rotator 1420. Accordingly, polarization rotator 1420 may rotate the polarization state of modulated optical signals $\varphi'_{11(TM)}$-$\varphi'_{42(TM)}$ 90 degrees so that they propagate in the TE mode as well. The rotated modulated optical signals may be represented as $\varphi'_{11(TE')}$-$\varphi'_{42(TE')}$, and may propagate along waveguide 1408 in the TE mode.

After polarization beam splitting (and in certain examples, polarization rotation), the modulated optical signals of known polarization may be carried to waveband demultiplexers. In particular, waveguide 1404 may carry modulated optical signals $\varphi'_{11(TE)}$-$\varphi'_{42(TE)}$ to waveband demultiplexer 1430, and waveguide 1408 may carry modulated optical signals $\varphi'_{11(TE')}$-$\varphi'_{42(TE')}$ to waveband demultiplexer 1432.

Waveband demultiplexers 1430 and 1432 may be the same/similar as the waveband demultiplexers described in conjunction with previous figures. Accordingly, waveband demultiplexer 1430 may split modulated optical signals $\varphi'_{11(TE)}$-$\varphi'_{42(TE)}$ according to waveband. In particular: modulated optical signals $\varphi'_{11(TE)}$ and $\varphi'_{12(TE)}$) may be split onto waveguide 1440; modulated optical signals $\varphi'_{21(TE)}$ and $\varphi'_{22(TE)}$ may be split onto waveguide 1442; modulated optical signals $\varphi'_{31(TE)}$ and $\varphi'_{32(TE)}$ may be split onto waveguide 1444; and modulated optical signals $\varphi'_{41(TE)}$ and $\varphi'_{42(TE)}$ may be split onto waveguide 1446. In the same/similar fashion waveband demultiplexer 1432 may split modulated optical signals $\varphi'_{11(TE')}$-$\varphi'_{42(TE')}$ according to waveband. In particular: modulated optical signals $\varphi'_{11(TE')}$ and $\varphi'_{12(TE')}$ may be split onto waveguide 1440; modulated optical signals $\varphi'_{21(TE')}$ and $\varphi'_{22(TE')}$ may be split onto waveguide 1442; modulated optical signals $\varphi'_{31(TE')}$ and $\varphi'_{32(TE')}$ may be split onto waveguide 1444; and modulated optical signals $\varphi'_{41(TE')}$ and $\varphi'_{42(TE')}$ may be split onto waveguide 1446.

As described above, after demultiplexing, each of waveguides 1440-1446 may carry modulated optical signals of a common CWDM waveband. In particular: waveguide 1440 may carry modulated optical signals of the first CWDM waveband (i.e., modulated optical signals $\varphi'_{11(TE)}$, $\varphi'_{12(TE)}$, $\varphi'_{11(TE')}$ and $\varphi'_{12(TE')}$); waveguide 1442 may carry modulated optical signals of the second CWDM waveband (i.e., modulated optical signals $\varphi'_{21(TE)}$, $\varphi'_{22(TE)}$, $\varphi'_{21(TE')}$ and $\varphi'_{22(TE')}$); waveguide 1444 may carry modulated optical signals of the third CWDM waveband (i.e., modulated optical signals $\varphi'_{31(TE)}$, $\varphi'_{32(TE)}$, $\varphi'_{31(TE')}$ and $\varphi'_{32(TE')}$); and waveguide 1446 may carry modulated optical signals of the fourth CWDM waveband (i.e., modulated optical signals $\varphi'_{41(TE)}$, $\varphi'_{42(TE)}$, $\varphi'_{41(TE')}$ and $\varphi'_{42(TE')}$).

Adjacent to each of waveguides 1440-1446 may be two microring resonators. As described above, a microring resonator may refer to a closed-loop waveguide which couples an input waveguide to an output waveguide. Here, the microring resonators couple waveguides 1440-1446 to the waveguides which include waveguide photodetectors 1460-1467. In particular: microring resonator 1450 couples waveguide 1440 to the waveguide which includes waveguide photodetector 1460; microring resonator 1451 couples waveguide 1440 to the waveguide which includes waveguide photodetector 1461; microring resonator 1452 couples waveguide 1442 to the waveguide which includes waveguide photodetector 1462; microring resonator 1453 couples waveguide 1442 to the waveguide which includes waveguide photodetector 1463; microring resonator 1454 couples waveguide 1444 to the waveguide which includes waveguide photodetector 1464; microring resonator 1455 couples waveguide 1444 to the waveguide which includes waveguide photodetector 1465; microring resonator 1456 couples waveguide 1446 to the waveguide which includes waveguide photodetector 1466; and microring resonator 1457 couples waveguide 1446 to the waveguide which includes waveguide photodetector 1467. Similar to the other components described above, these microring resonators may be constructed/sourced from readily available silicon photonic and III-V foundry process design kits.

In the example of waveband receiver 1400, the eight microring resonators may act as drop filters for optical signals of certain wavelengths. For example, microring resonator 1450 may be tuned to "drop" modulated optical signals of the first wavelength of the first CWDM waveband (e.g., modulated optical signals $\varphi'_{11(TE)}$ and $\varphi'_{11(TE')}$), while allowing modulated optical signals of other wavelengths to pass undisturbed. Accordingly, microring resonator 1450 may drop modulated optical signals $\varphi'_{11(TE)}$ and $\varphi'_{11(TE')}$ onto the waveguide which includes waveguide photodetector 1460—while allowing modulated optical signals $\varphi'_{12(TE)}$ and $\varphi'_{12(TE')}$ to pass undisturbed. In the same/similar manner, microring resonator 1451 may drop modulated optical signals $\varphi'_{12(TE)}$ and $\varphi'_{12(TE')}$ onto the waveguide which includes waveguide photodetector 1461—while allowing modulated optical signals $\varphi'_{11(TE)}$ and $\varphi'_{11(TE')}$ to pass undisturbed. Microring resonators 1452-1457 may be tuned in the same/similar manner such that they "drop" modulated optical signals of one wavelength per CWDM waveband while allowing modulated optical signals of other wavelengths to pass undisturbed.

Accordingly, waveguide photodetector 1460 may detect modulated optical signals $\varphi'_{11(TE)}$ and $\varphi'_{11(TE')}$; waveguide photodetector 1461 may detect modulated optical signals $\varphi'_{12(TE)}$ and $\varphi'_{12(TE')}$; waveguide photodetector 1462 may detect modulated optical signals $\varphi'_{21(TE)}$ and $\varphi'_{21(TE')}$; waveguide photodetector 1463 may detect modulated optical signals $\varphi'_{22(TE)}$ and $\varphi'_{22(TE')}$; waveguide photodetector 1464 may detect modulated optical signals $\varphi'_{31(TE)}$ and $\varphi'_{31(TE')}$; waveguide photodetector 1465 may detect modulated optical signals $\varphi'_{32(TE)}$ and $\varphi'_{32(TE')}$; waveguide photodetector 1466 may detect modulated optical signals $\varphi'_{41(TE)}$ and $\varphi'_{41(TE')}$; and waveguide photodetector 1467 may detect modulated optical signals $\varphi'_{42(TE)}$ and $\varphi'_{42(TE')}$. As described above, detecting a modulated optical signal may correspond to reading/extracting the data imparted onto it.

In certain examples, prior to being detected by waveguide photodetectors 1460-1467, either (or both) of modulated optical signals $\varphi'_{11(TE)}$-$\varphi'_{42(TE)}$ and modulated optical signals $\varphi'_{11(TE')}$-$\varphi'_{42(TE')}$ may be transmitted through phase shifters (PS) located on the same waveguides as waveguide photodetectors 1460-1467. These phase shifters may be used to account for any polarization modal dispersion in optical fibers and time delays caused by the modulated optical signals taking different paths to the waveguide photodetectors (e.g., waveguide 1408 may be longer than waveguide 1404).

Similar to waveband receiver 1300, waveband receiver 1400 may also operate with existing CWDM/CWDM-4 technologies. For example, waveband receiver 1400 may be combined with existing CWDM-4 technologies by calibrating/tuning: waveguide photodetector 1460 to detect modulated optical signals of a first CWDM-4 wavelength; waveguide photodetector 1462 to detect modulated optical signals of a second CWDM-4 wavelength; waveguide photodetector 1464 to detect modulated optical signals of a third CWDM-4 wavelength; and waveguide photodetector 1466 to detect modulated optical signals of a fourth CWDM-4 wavelength. Similarly, the other optical components of waveband receiver 1400 may be calibrated/tuned to operate with these CWDM-4 wavelengths. Accordingly, waveband receiver 1400 may operate with existing CWDM-4 technologies, as well as scaled-up technologies which utilize the CWDM wavebands of the present disclosure.

Similar to the previously described waveband devices, waveband receiver 1400 may be constructed using many readily available building blocks found in silicon photonic and III-V foundry process design kits (e.g., wideband fiber to chip couplers, CWDM-4 waveguide photodetectors, etc.).

Figure 15:
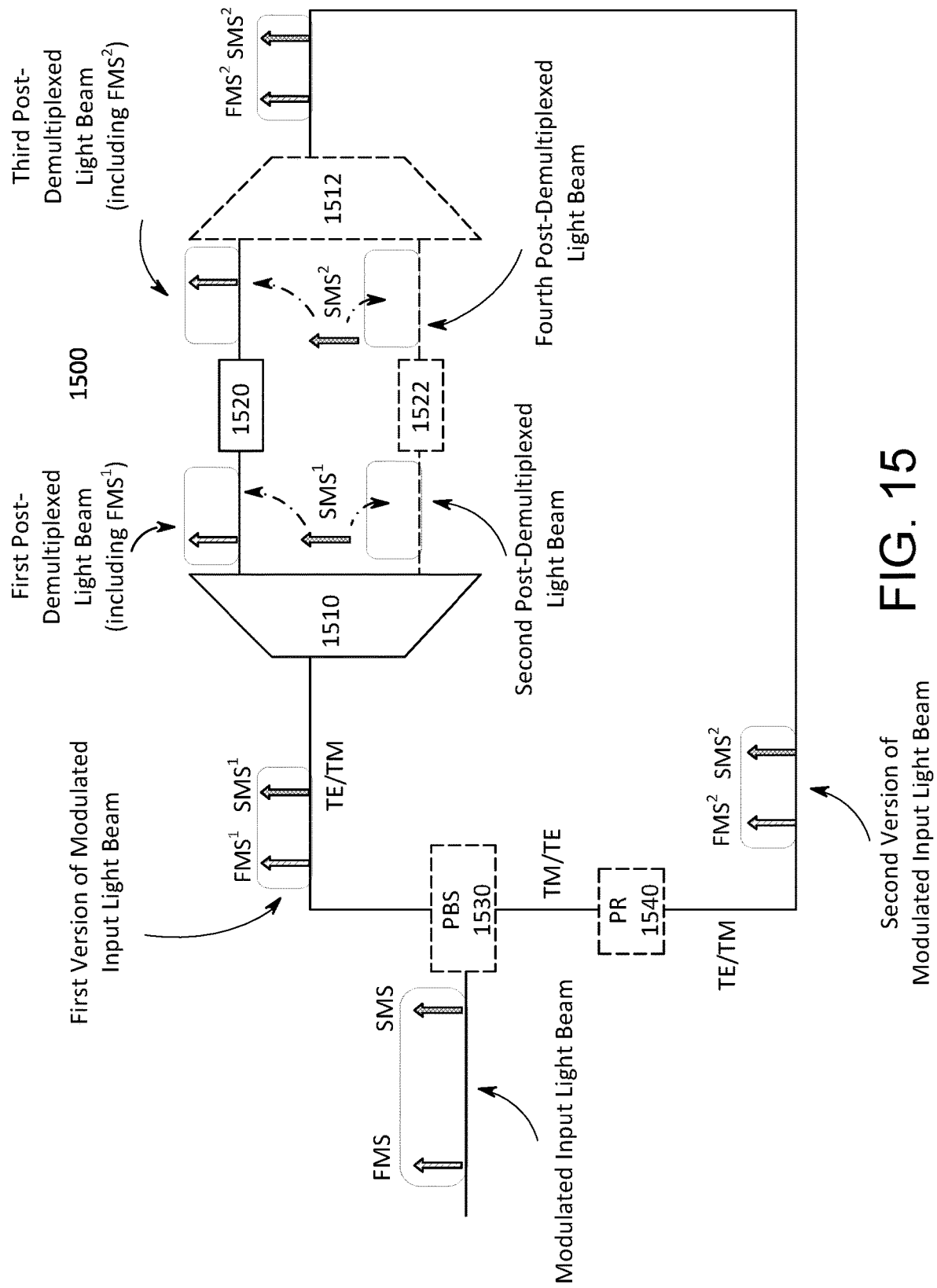
FIG. 15 depicts another example waveband receiver, in accordance with various examples of the presently disclosed technology.

FIG. 15 depicts another example waveband receiver, in accordance with various examples of the presently disclosed technology. Waveband receiver 1500 may be viewed as a generic waveband receiver from which waveband receivers 1300 and 1400 may be derived.

Waveband receiver 1500 may comprise: a first combination of one or more optical demultiplexers 1510, and at least a first optical photodetector 1520. These components may be connected by various waveguides. In certain examples, waveband receiver 1500 may also comprise a polarization beam splitter 1530, a polarization rotator 1540, optical phase shifters (not depicted), and other optical devices/components (e.g., a second combination of one or more optical demultiplexers 1512, a second optical photodetector 1522, etc.).

The first combination of one or more optical demultiplexers 1510 may split a first version of a modulated input light beam into at least a first post-demultiplexed light beam and a second post-demultiplexed light beam.

The first version of the modulated input light beam may comprise at least a first version of a first modulated optical signal (FMS') and a first version of a second modulated optical signal (SMS[1]). FMS[1] may be a first wavelength within a first CWDM passband and SMS[1] may be a second wavelength within the first CWDM passband. As described above, the first CWDM passband may comprise a spectrum of wavelengths that includes a CWDM wavelength, which can pass through an optical filter. In certain examples, the first CWDM passband may include the first CWDM-4 wavelength.

FMS[1] may relate to/derive from a first modulated optical signal (FMS) in various ways. In some examples, FMS[1] may be identical to FMS. In other examples, FMS[1] may be the transverse-electric (TE) mode of FMS, or the transverse-magnetic (TM) mode of FMS. In further examples, $FMS^1$ may be a TM mode of FMS which has been rotated 90 degrees so that it propagates in the TE mode. As described above, FMS may be a modulated version of a first optical signal (FS). FS may have been modulated by any of the waveband transmitters described in conjunction with FIGS. 8-12.

$SMS^1$ may relate to SMS in the same/similar ways.

The first post-demultiplexed light beam may comprise at least $FMS^1$. As described above, a post-demultiplexed light beam may refer to a light beam which has been split by one or more optical demultiplexers. In various examples, the first post-demultiplexed light beam may comprise additional modulated optical signals of different wavelengths. For example, in waveband receiver 1400 (which may be derived from waveband receiver 1500), the first post-demultiplexed light beam would comprise the first version of the second modulated optical signal (i.e., $SMS^1$) as well.

The second post-demultiplexed light beam may comprise at least a first version of one modulated optical signal which is a different wavelength than $FMS^1$. In certain examples (e.g., waveband receiver 1300), the first version of the one modulated optical signal which is a different wavelength than $FMS^1$ may be $SMS^1$. In other examples (e.g., waveband transmitter 1400), the first version of the one modulated optical signal which is a different wavelength than $FMS^1$ may be a first version of a third modulated optical signal (not depicted). In certain of these examples, the first version of the third modulated optical signal may be a first wavelength within a second CWDM passband.

The first optical photodetector (i.e., optical photodetector 1520) may detect the first post-demultiplexed light beam by detecting FMS'. An optical photodetector may refer to an optical device which can detect a modulated optical signal. An optical photodetector may be calibrated to detect modulated optical signals of a certain wavelength. For example, optical photodetector 1520 may be calibrated to detect modulated optical signals of $FMS^1$'s wavelength (i.e., the first wavelength within the first CWDM passband). The first optical photodetector 1520 may be various types of optical photodetectors, including a waveguide photodetector.

As described above, waveband receiver 1500 may include additional components. For example, waveband receiver 1500 may include a polarization beam splitter 1530. Polarization beam splitter 1530 may split the modulated input light beam into the first version of the modulated input light beam and a second version of the modulated input light beam. The second version of the modulated input light beam may comprise at least a second version of the first modulated optical signal ($FMS^2$) and a second version of the second modulated optical signal ($SMS^2$).

In certain examples the first version of the modulated input light beam may be the TE mode of the modulated input light beam and the second version of the modulated input light beam may be the TM mode of the modulated input light beam. In some of these examples, waveband receiver 1500 may include a polarization rotator 1540 which rotates the second version of the modulated input light beam 90 degrees so that it also propagates in the TE mode.

In examples where waveband receiver 1500 splits the modulated input light beam into a first and second version of the modulated input light beam, waveband receiver 1500 may include a second combination of one or more optical demultiplexers 1512 which splits the second version of the modulated input light beam into a third post-demultiplexed light beam and a fourth post-demultiplexed light beam.

The third post-demultiplexed light beam may comprise at least $FMS^2$. In various examples, the third post-demultiplexed light beam may comprise additional modulated optical signals of different wavelengths. For example, in waveband receiver 1400 (which may be derived from waveband receiver 1500), the third post-demultiplexed light beam would comprise the second version of the second modulated optical signal (i.e., $SMS^2$) as well.

The fourth post-demultiplexed light beam may comprise at least a second version of one modulated optical signal which is a different wavelength than $FMS^2$. In certain examples (e.g., waveband receiver 1300), the second version of the one modulated optical signal which is a different wavelength than $FMS^2$ may be $SMS^2$. In other examples (e.g., waveband transmitter 1400), the second version of the one modulated optical signal which is a different wavelength than $FMS^2$ may be a second version of a third modulated optical signal (not depicted). In certain of these examples, the second version of a third modulated optical signal may be a first wavelength within a second CWDM passband.

Waveband receiver 1500 may also include additional optical photodetectors. For example, waveband receiver 1500 may have a second optical photodetector 1522 which detects modulated optical signals of a different wavelength than FMS' and $FMS^2$. For example, the second optical photodetector may be calibrated to detect modulated optical signals of a second wavelength of the first CWDM passband (e.g., SMS' and $SMS^2$), a first wavelength of a second CWDM passband, etc.

Similar to waveband receiver 1300 and 1400, waveband receiver 1500 may also operate with existing CWDM/CWDM-4 technologies. For example, waveband receiver 1500 may be combined with existing CWDM-4 technologies by calibrating/tuning the first optical photodetector 1520 to detect modulated optical signals of a first CWDM-4 wavelength. Additional optical photodetectors which may be included in waveband receiver 1500 may also be calibrated to detect modulated optical signals CWDM-4 wavelengths. Similarly, the other optical components of waveband receiver 1500 (e.g., the combination of one or more demultiplexers) may be calibrated/tuned to operate with these CWDM-4 wavelengths. Accordingly, waveband receiver 1500 may operate with existing CWDM-4 technologies, as well as scaled-up technologies which utilize the CWDM wavebands of the present disclosure.

Moreover, similar to the previously described waveband devices, waveband receiver 1500 may be constructed using many readily available building blocks found in silicon photonic and III-V foundry process design kits (e.g., wideband fiber to chip couplers, CWDM-4 waveguide photodetectors, etc.).

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A light source having a first mode and a second mode, the light source comprising:
   at least a first laser array, wherein:
      in the first mode, the first laser array emits optical signals of only a first wavelength within a first Coarse Wavelength Division Multiplexing (CWDM) passband, wherein the first CWDM passband is a spectrum of wavelengths that includes a first CWDM wavelength; and
      in the second mode, the first laser array emits optical signals of at least the first wavelength within the first CWDM passband and a second wavelength within the first CWDM passband.

2. The light source of claim 1, further comprising a second, third, and fourth laser array, wherein:
   in the second mode:
      the second laser array emits optical signals of at least a first and second wavelength within a second CWDM passband, wherein the second CWDM passband is a spectrum of wavelengths that includes a second CWDM wavelength,
      the third laser array emits optical signals of at least a first and second wavelength within a third CWDM passband, wherein the third CWDM passband is a spectrum of wavelengths that includes a third CWDM wavelength, and
      the fourth laser array emits optical signals of at least a first and second wavelength within a fourth CWDM passband, wherein the fourth CWDM passband is a spectrum of wavelengths that includes a fourth CWDM wavelength, and
   in the first mode:
      the second laser array emits optical signals of only the first wavelength within the second CWDM passband,
      the third laser array emits optical signals of only the first wavelength within the third CWDM passband, and
      the fourth laser array emits optical signals of only the first wavelength within the fourth CWDM passband.

3. The light source of claim 2, wherein:
   the first CWDM wavelength is a first CWDM-4 wavelength;
   the second CWDM wavelength is a second CWDM-4 wavelength;
   the third CWDM wavelength is a third CWDM-4 wavelength; and
   the fourth CWDM wavelength is a fourth CWDM-4 wavelength.

4. The light source of claim 2, wherein:
   the first wavelength within the first CWDM passband is the first CWDM-4 wavelength;
   the first wavelength within the second CWDM passband is the second CWDM-4 wavelength;
   the first wavelength within the third CWDM passband is the third CWDM-4 wavelength; and
   the first wavelength within the fourth CWDM passband is the fourth CWDM-4 wavelength.

5. The light source of claim 1, further comprising an optical coupler, wherein, in the second mode, the optical coupler:
   receives, from a first input waveguide, a first optical signal, wherein the first optical signal is the first wavelength within the first CWDM passband;
   receives, from a second input waveguide, a second optical signal, wherein the second optical signal is the second wavelength within the first CWDM passband; and
   combines, onto a first output waveguide, a version of the first optical signal with a version of the second optical signal.

6. The light source of claim 5, wherein:
   the version of the first optical signal is a first power reduced version of the first optical signal; and
   the optical coupler:
      splits, onto the first output waveguide, the first power reduced version of the first optical signal; and
      splits, onto a second output waveguide, a second power reduced version of the first optical signal.

7. The light source of claim 1, wherein the optical coupler comprises a star coupler.

8. The light source of claim 7, wherein the star coupler comprises one or more multimode interference devices.

9. A light source having a first mode and a second mode, the light source comprising:
   at least a first laser array, wherein:
      in the first mode, the first laser array emits optical signals of only a first wavelength within a first Coarse Wavelength Division Multiplexing (CWDM) passband, wherein the first CWDM passband is a spectrum of wavelengths that includes a first CWDM wavelength; and
      in the second mode, the first laser array emits optical signals of at least the first wavelength within the first CWDM passband and a second wavelength within the first CWDM passband; and
   an optical coupler, wherein in the second mode, the optical coupler:
      receives, from a first input waveguide, a first optical signal, wherein the first optical signal is the first wavelength within the first CWDM passband;
      receives, from a second input waveguide, a second optical signal, wherein the second optical signal is the second wavelength within the first CWDM passband; and
      combines, onto a first output waveguide, a version of the first optical signal with a version of the second optical signal.

10. The light source of claim 9, further comprising a second, third, and fourth laser array, wherein:
   in the second mode:
      the second laser array emits optical signals of at least a first and second wavelength within a second CWDM passband, wherein the second CWDM passband is a spectrum of wavelengths that includes a second CWDM wavelength,
      the third laser array emits optical signals of at least a first and second wavelength within a third CWDM passband, wherein the third CWDM passband is a spectrum of wavelengths that includes a third CWDM wavelength, and
      the fourth laser array emits optical signals of at least a first and second wavelength within a fourth CWDM passband, wherein the fourth CWDM passband is a spectrum of wavelengths that includes a fourth CWDM wavelength, and in the first mode:
the second laser array emits optical signals of only the first wavelength within the second CWDM passband,
the third laser array emits optical signals of only the first wavelength within the third CWDM passband, and
the fourth laser array emits optical signals of only the first wavelength within the fourth CWDM passband.

11. The light source of claim 10, wherein:
the first CWDM wavelength is a first CWDM-4 wavelength;
the second CWDM wavelength is a second CWDM-4 wavelength;
the third CWDM wavelength is a third CWDM-4 wavelength; and
the fourth CWDM wavelength is a fourth CWDM-4 wavelength.

12. The light source of claim 10, wherein:
the first wavelength within the first CWDM passband is the first CWDM-4 wavelength;
the first wavelength within the second CWDM passband is the second CWDM-4 wavelength;
the first wavelength within the third CWDM passband is the third CWDM-4 wavelength; and
the first wavelength within the fourth CWDM passband is the fourth CWDM-4 wavelength.

13. The light source of claim 9, wherein the optical coupler comprises one or more of: a star coupler or a multimode interference device.

14. The light source of claim 9, wherein:
the version of the first optical signal is a first power reduced version of the first optical signal; and
the optical coupler:
splits, onto the first output waveguide, the first power reduced version of the first optical signal; and
splits, onto a second output waveguide, a second power reduced version of the first optical signal.

15. A method comprising:
in a first mode of a light source, emitting, by a first laser array, optical signals of only a first wavelength within a first Coarse Wavelength Division Multiplexing (CWDM) passband, wherein the first CWDM passband is a spectrum of wavelengths that includes a first CWDM wavelength; and
in a second mode of the light source, emitting, by the first laser array, optical signals of at least the first wavelength within the first CWDM passband and a second wavelength within the first CWDM passband.

16. The method of claim 15, wherein the light source comprises a second, third, and fourth laser array, wherein:
in the second mode:
emitting, by the second laser array, optical signals of at least a first and second wavelength within a second CWDM passband, wherein the second CWDM passband is a spectrum of wavelengths that includes a second CWDM wavelength,
emitting, by the third laser array, optical signals of at least a first and second wavelength within a third CWDM passband, wherein the third CWDM passband is a spectrum of wavelengths that includes a third CWDM wavelength, and
emitting, by the fourth laser array, optical signals of at least a first and second wavelength within a fourth CWDM passband, wherein the fourth CWDM passband is a spectrum of wavelengths that includes a fourth CWDM wavelength, and
in the first mode:
emitting, by the second laser array, optical signals of only the first wavelength within the second CWDM passband,
emitting, by the third laser array, optical signals of only the first wavelength within the third CWDM passband, and
emitting, by the fourth laser array, optical signals of only the first wavelength within the fourth CWDM passband.

17. The method of claim 16, wherein:
the first CWDM wavelength is a first CWDM-4 wavelength;
the second CWDM wavelength is a second CWDM-4 wavelength;
the third CWDM wavelength is a third CWDM-4 wavelength; and
the fourth CWDM wavelength is a fourth CWDM-4 wavelength.

18. The method of claim 16, wherein:
the first wavelength within the first CWDM passband is the first CWDM-4 wavelength;
the first wavelength within the second CWDM passband is the second CWDM-4 wavelength;
the first wavelength within the third CWDM passband is the third CWDM-4 wavelength; and
the first wavelength within the fourth CWDM passband is the fourth CWDM-4 wavelength.

19. The method of claim 15, wherein the light source comprises an optical coupler, wherein the method comprises, in the second mode:
receiving, by the optical coupler from a first input waveguide, a first optical signal, wherein the first optical signal is the first wavelength within the first CWDM passband;
receiving, by the optical coupler from a second input waveguide, a second optical signal, wherein the second optical signal is the second wavelength within the first CWDM passband; and
combining, onto a first output waveguide, a version of the first optical signal with a version of the second optical signal.

20. The method of claim 19, wherein:
the version of the first optical signal is a first power reduced version of the first optical signal; and
the method comprises:
splitting, by the optical coupler onto the first output waveguide, the first power reduced version of the first optical signal; and
splitting, by the optical coupler onto a second output waveguide, a second power reduced version of the first optical signal.

* * * * *